US009197987B2

(12) United States Patent
Kawasaki

(10) Patent No.: US 9,197,987 B2
(45) Date of Patent: Nov. 24, 2015

(54) WIRELESS COMMUNICATION TERMINAL WITH AN RFID MODULE, WIRELESS COMMUNICATION SYSTEM, WIRELESS COMMUNICATION METHOD, AND A DEVICE STORING A PROGRAM

(71) Applicant: OLYMPUS CORPORATION, Tokyo (JP)

(72) Inventor: Shinya Kawasaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/331,854

(22) Filed: Jul. 15, 2014

(65) Prior Publication Data

US 2015/0031302 A1   Jan. 29, 2015

(30) Foreign Application Priority Data

Jul. 25, 2013   (JP) ................................. 2013-154951

(51) Int. Cl.
| | | |
|---|---|---|
| H04B 7/00 | (2006.01) | |
| H04W 4/00 | (2009.01) | |
| H04L 12/00 | (2006.01) | |
| H04M 1/725 | (2006.01) | |
| H04W 52/00 | (2009.01) | |
| H04W 8/24 | (2009.01) | |
| H04W 76/02 | (2009.01) | |
| H04W 88/06 | (2009.01) | |

(52) U.S. Cl.
CPC .............. *H04W 4/008* (2013.01); *H04L 12/00* (2013.01); *H04M 1/7253* (2013.01); *H04W 52/00* (2013.01); *H04M 2250/04* (2013.01); *H04W 8/24* (2013.01); *H04W 76/02* (2013.01); *H04W 88/06* (2013.01)

(58) Field of Classification Search
CPC . H04M 2250/04; H04W 4/008; H04W 52/00; H04W 76/02
See application file for complete search history.

(56) References Cited

U.S. PATENT DOCUMENTS

| | | | | |
|---|---|---|---|---|
| 7,433,699 | B2* | 10/2008 | Kohno et al. | ................. 455/466 |
| 2004/0199303 | A1* | 10/2004 | Ohmura et al. | .................. 701/5 |

(Continued)

FOREIGN PATENT DOCUMENTS

| | | | |
|---|---|---|---|
| JP | 2004-282248 A | 10/2004 | |
| JP | 2004-304732 A | 10/2004 | |

(Continued)

OTHER PUBLICATIONS

Japanese Office Action dated Dec. 9, 2014, issued in corresponding JP Patent Application No. 2013-154951 with English translation (4 pages).

*Primary Examiner* — David Bilodeau
(74) *Attorney, Agent, or Firm* — Westerman, Hattori, Daniels & Adrian, LLP

(57) ABSTRACT

A wireless communication terminal includes: a wireless communication module, a power supply unit configured to perform electric power supply to the wireless communication module, a power supply control unit configured to perform power supply control of the power supply unit, a control unit configured to set parameters of a layer higher than a data link layer to parameters of the wireless communication module, an RFID module configured to store wireless communication setting information and data presence/absence information and wirelessly transmit the wireless communication setting information, and a data update unit configured to update the data presence/absence information stored in the RFID module.

15 Claims, 16 Drawing Sheets

(56) References Cited

U.S. PATENT DOCUMENTS

2010/0022188 A1* 1/2010 Nakagawa .................. 455/41.2
2013/0038634 A1* 2/2013 Yamada et al. .............. 345/649

FOREIGN PATENT DOCUMENTS

| | | |
|---|---|---|
| JP | 4585582 B2 | 11/2010 |
| WO | 2012/070250 A1 | 5/2012 |

* cited by examiner

| COMMUNICATION SETTING INFORMATION | MAC ADDRESS | AA:BB:CC:DD:FF:00:11 |
| --- | --- | --- |
| | COMMUNICATION CH | 6 |
| | IP ADDRESS | 192.168.123.45 |
| | SECURITY | Mode=WPA2 |
| | | Key=12345ABCDE |
| | SSID | XYZ0123 |
| | SUBNET MASK | 255.255.255.0 |
| | DEFAULT GATEWAY | 192.168.123.45 |
| DATA PRESENCE/ABSENCE INFORMATION | DATA | 1 |

FIG. 9

| COMMUNICATION SETTING INFORMATION | MAC ADDRESS | | AA:BB:CC:DD:FF:00:11 |
|---|---|---|---|
| | COMMUNICATION CH | | 6 |
| | IP ADDRESS | | 192.168.123.45 |
| | SECURITY | | Mode=WPA2 |
| | | | Key=12345ABCDE |
| | SSID | | XYZ0123 |
| | SUBNET MASK | | 255.255.255.0 |
| | DEFAULT GATEWAY | | 192.168.123.45 |
| TRANSMISSION TARGET DATA LIST | TARGET DEVICE | MAC ADDRESS | 01:23:45:67:89:AB |
| | | DATA | 1 |
| | | ACCESS PATH | ¥DCIM¥..¥ABC0001.JPG |
| | | | ¥DCIM¥..¥ABC0008.JPG |
| | | | ¥DCIM¥..¥ABC0011.JPG |
| | | | ¥DCIM¥..¥ABC0012.JPG |
| | TARGET DEVICE | MAC ADDRESS | 98:76:54:DD:FF:00:11 |
| | | DATA | 0 |
| | TARGET DEVICE | MAC ADDRESS | CD:AB:EF:33:22:11 |
| | | DATA | 1 |
| | | ACCESS PATH | ¥DCIM¥..¥ABC0012.JPG |
| | | | ¥DCIM¥..¥ABC0015.JPG |
| | TARGET DEVICE | MAC ADDRESS | Unknown |
| | | DATA | 1 |
| | | ACCESS PATH | ¥DCIM¥..¥*.JPG |

FIG. 12

| COMMUNICATION SETTING INFORMATION | MAC ADDRESS | AA:BB:CC:DD:FF:00:11 | | |
|---|---|---|---|---|
| | COMMUNICATION CH | 6 | | |
| | IP ADDRESS | 192.168.123.45 | | |
| | SECURITY | Mode=WPA2 Key=12345ABCDE | | |
| | SSID | XYZ0123 | | |
| | SUBNET MASK | 255.255.255.0 | | |
| | DEFAULT GATEWAY | 192.168.123.45 | | |
| TRANSMISSION TARGET DATA LIST | TARGET DEVICE | MAC ADDRESS | CD:AB:EF:33:22:11 | |
| | | DATA | ¥DCIM¥．¥ABC0012.JPG ¥DCIM¥．¥ABC0015.JPG | |
| | | ACCESS PATH | SHOOTING DATE AND TIME | 2009_01-2009_12 ¥List¥date_2009.xml |
| | | | | 2010_01-2010_12 ¥List¥date_2010.xml |
| | | EXIF INFORMATION (REPRESENTATIVE EXAMPLE) | MANUFACTURER NAME | OLYMPUS ¥List¥OLY.xml |
| | | | MODEL NAME | A0001 ¥List¥Model_A0001.xml |
| | | | | B0123 ¥List¥Model_B0123.xml |
| | | | SHOOTING POSITION INFORMATION | KYOTO ¥List¥Place¥kyoto.xml |
| | | | | OSAKA ¥List¥Place¥Osaka.xml |
| | | | | California ¥List¥Place¥California.xml |
| | | DPOF | ¥DCIM¥．¥ABC0012.JPG | |
| | TARGET DEVICE | MAC ADDRESS | Unknown | |
| | | DATA | ¥DCIM¥．¥*.JPG | |
| | | ACCESS PATH | SHOOTING DATE AND TIME | 2009_01-2009_12 ¥List¥date_2009.xml |
| | | | | 2010_01-2010_12 ¥List¥date_2010.xml |
| | | EXIF INFORMATION (REPRESENTATIVE EXAMPLE) | MANUFACTURER NAME | OLYMPUS ¥List¥OLY.xml |
| | | | MODEL NAME | A0001 ¥List¥Model_A0001.xml |
| | | | | B0123 ¥List¥Model_B0123.xml |
| | | | SHOOTING POSITION INFORMATION | KYOTO ¥List¥Place¥kyoto.xml |
| | | | | OSAKA ¥List¥Place¥Osaka.xml |
| | | | | California ¥List¥Place¥California.xml |
| | | DPOF | ¥DCIM¥．¥ABC0001.JPG ¥DCIM¥．¥ABC0008.JPG ¥DCIM¥．¥ABC0011.JPG ¥DCIM¥．¥ABC0020.JPG | |

WIRELESS COMMUNICATION TERMINAL WITH AN RFID MODULE, WIRELESS COMMUNICATION SYSTEM, WIRELESS COMMUNICATION METHOD, AND A DEVICE STORING A PROGRAM

BACKGROUND OF THE INVENTION

1. Field of the Invention

The present invention relates to a wireless communication terminal with an RFID (Radio-Frequency Identification) module, a wireless communication system, a wireless communication method, and a device storing a program.

Priority is claimed on Japanese Patent Application No. 2013-154951, filed Jul. 25, 2013, the content of which is incorporated herein by reference.

2. Description of Related Art

A method of using Near Field Communication (NFC) has been known as a method of transferring image data stored in a wireless communication terminal, such as a camera with a wireless function, to an external terminal such as a smartphone.

For example, the wireless communication terminal has an electronic tag (tag) storing wireless setting information or the like which is necessary when the external terminal performs communication with the wireless communication terminal. Further, the external terminal includes a tag reader that reads content of a tag. The external terminal reads a tag using the tag reader and acquires wireless setting information of the wireless communication terminal. Further, the external terminal establishes a wireless connection with the wireless communication terminal using the acquired communication setting information, and performs transmission and reception of image data.

Generally, when wireless connection is performed between the wireless communication terminal and the external terminal, electric power supply of both terminals is turned on by a user's operation. As a representative example of the external terminal, there are smartphones in which electric power supply is consistently in an ON state, but it is complicated for the user to turn even electric power supply of the wireless communication terminal side on or off when image data is transferred.

Further, a technique of detecting an approach of a communication device and turning electric power supply on has been known (for example, see Japanese Patent No. 4585582). The technique disclosed in Japanese Patent No. 4585582 is a configuration including an approaching wireless communication device, an approach detecting unit, and a device control unit. The approaching wireless communication device operates at first power consumption in a "standby state" in which the approaching wireless communication device is on standby for a connection request from an external device. The approach detecting unit operates at second power consumption lower than the first power consumption, and detects that the approaching wireless communication device and the external device are in a proximity state. When the approach detecting unit detects the proximity state, the device control unit activates the approaching wireless communication device, and enters the standby state from the power save state or the power off state. Further, when the approach detecting unit detects release of the proximity state, the device control unit causes the approaching wireless communication device to enter the power save state or the power off state.

SUMMARY OF THE INVENTION

A wireless communication terminal with an RFID module according to a first aspect of the present invention includes a wireless communication module configured to operate in one of a first state in which wireless communication with an external terminal is performed through a layer higher than a data link layer and a second state in which the wireless communication with the external terminal is not performed through the layer higher than the data link layer or electric power supply used to perform wireless communication with the external terminal through the data link layer is not performed, the wireless communication module wirelessly transmitting transmission target data when operating in the first state, a power supply unit configured to perform the electric power supply to the wireless communication module, a power supply control unit configured to perform power supply control of the power supply unit, a control unit configured to set parameters of the layer higher than the data link layer to parameters of the wireless communication module, an RFID module configured to store wireless communication setting information which is used for the external terminal to perform wireless communication with the wireless communication module and data presence/absence information indicating presence/absence of the transmission target data, the RFID module detecting a read request to read the wireless communication setting information transmitted from the external terminal, the RFID module wirelessly transmitting the wireless communication setting information to the external terminal that has transmitted the read request in response to the read request when the read request is detected, and a data update unit configured to update the data presence/absence information stored in the RFID module. The RFID module outputs a signal to one of the control unit and the power supply control unit when the read request is detected and the data presence/absence information indicating the presence of the transmission target data is stored while the wireless communication module is operating in the second state, the signal causing a state of the wireless communication module to transition from the second state to the first state.

According to a second aspect of the present invention, in the wireless communication terminal with the RFID module according to the first aspect, the first state may be a state in which the electric power supply is performed from the power supply unit to the wireless communication module. The second state may be a state in which the electric power supply is not performed from the power supply unit to the wireless communication module. The power supply control unit may control the electric power supply to the wireless communication module. The RFID module may output a signal to instruct the electric power supply to the wireless communication module to the power supply control unit as the signal causing transition from the second state to the first state.

According to a third aspect of the present invention, the wireless communication terminal with the RFID module according to the second aspect may further include a display unit configured to display data. The power supply unit may perform the electric power supply to the wireless communication module, and the power supply control unit may control the electric power supply to the display unit.

According to a fourth aspect of the present invention, in the wireless communication terminal with the RFID module according to the third aspect, the power supply control unit may detect residual electric power supply of the power supply unit when the signal to instruct the electric power supply to the wireless communication module is input from the RFID module. The power supply control unit may control the power supply unit such that the electric power supply is performed to the display unit and the wireless communication unit when the residual electric power supply is equal to or larger than a first threshold value. The power supply control unit may control the power supply unit such that the electric power supply is performed to the wireless communication unit without supplying the electric power supply to the display unit when the residual electric power supply of the power supply unit is less than the first threshold value.

According to a fifth aspect of the present invention, in the wireless communication terminal with the RFID module according to the fourth aspect, the power supply control unit may detect the residual electric power supply of the power supply unit when the signal to instruct the electric power supply to the wireless communication module is input from the RFID module. The power supply control unit may control the power supply unit such that the electric power supply is not performed to the display unit but performed to the wireless communication unit when the residual electric power supply is equal to or larger than a second threshold value which is lower than the first threshold value. The power supply control unit may control the power supply unit such that the electric power supply is not performed to the wireless communication unit and the display unit when the residual electric power supply is equal to or less than the second threshold value.

According to a sixth aspect of the present invention, in the wireless communication terminal with the RFID module according to the first aspect, the RFID module may output a signal, which causes transition from a standby state as the second state to an active state as the first state, to the control unit as the signal causing transition from the second state to the first state.

According to a seventh aspect of the present invention, in the wireless communication terminal with the RFID module according to the first aspect, the RFID module may store a list of the transmission target data as the data presence/absence information, and may transmit the list to the external terminal.

According to an eighth aspect of the present invention, in the wireless communication terminal with the RFID module according to the first aspect, the data update unit may update the data presence/absence information stored in the RFID module after the wireless communication module transmits the transmission target data to the external terminal.

According to a ninth aspect of the present invention, in the wireless communication terminal with the RFID module according to the first aspect, the RFID module may store the data presence absence information for each external terminal. The data update unit may update the data presence/absence information for each external terminal.

According to a tenth aspect of the present invention, the wireless communication terminal with the RFID module according to the first aspect may further include a storage unit configured to store metadata of the transmission target data and a generating unit configured to generate the data presence/absence information based on the metadata.

According to an eleventh aspect of the present invention, in the wireless communication terminal with the RFID module according to the first aspect, when information designating a condition of the transmission target data is acquired from the external terminal, the RFID module may determine whether or not there is transmission target data satisfying the condition, and may wirelessly transmit the wireless communication setting information when it is determined that there is transmission target data satisfying the condition.

According to a twelfth aspect of the present invention, in the wireless communication terminal with the RFID module according to the first aspect, the power supply unit may not perform the electric power supply to the RFID module.

A wireless communication system according to a thirteenth aspect of the present invention includes a wireless communication terminal with an RFID module and an external terminal. The wireless communication terminal with the RFID module includes a wireless communication module configured to operate in one of a first state in which wireless communication with the external terminal is performed through a layer higher than a data link layer and a second state in which the wireless communication with the external terminal is not performed through the layer higher than the data link layer or electric power supply used to perform wireless communication with the external terminal through the data link layer is not performed, the wireless communication module wirelessly transmitting transmission target data when operating in the first state, a power supply unit configured to perform the electric power supply to the wireless communication module, a power supply control unit configured to perform power supply control of the power supply unit, a control unit configured to perform control such that parameters of the layer higher than the data link layer is set to parameters of the wireless communication module, an RFID module configured to store wireless communication setting information which is used for the external terminal to perform wireless communication with the wireless communication module and data presence/absence information indicating presence/absence of the transmission target data, the RFID module detecting a read request to read the wireless communication setting information transmitted from the external terminal, the RFID module wirelessly transmitting the wireless communication setting information to the external terminal that has transmitted the read request in response to the read request when the read request is detected, and a data update unit configured to update the data presence/absence information stored in the RFID module. When the read request is detected and the data presence/absence information indicating the presence of the transmission target data is stored while the wireless communication module is operating in the second state, the RFID module outputs a signal to one of the control unit and the power supply control unit which causes a state of the wireless communication module to transition from the second state to the first state. The external terminal includes a tag reading unit configured to transmit the read request to the RFID module, and receive the wireless communication setting information transmitted in response to the read request, and a terminal wireless communication module configured to perform wireless communication with the wireless communication module using the wireless communication setting information received by the tag reading unit.

A wireless communication method according to a fourteenth aspect of the present invention includes a wireless communication step of wirelessly transmitting transmission target data when a wireless communication module operates in a first state, the wireless communication module being configured to operate in one of the first state in which wireless communication with an external terminal is performed through a layer higher than a data link layer and a second state in which the wireless communication with the external terminal is not performed through the layer higher than the data link layer or electric power supply used to perform wireless communication with the external terminal through the data link layer is not performed, a power supply control step of controlling power supply of a power supply unit configured to perform the electric power supply to the wireless communication module, a control step of setting parameters of the layer higher than the data link layer to parameters of the wireless communication module, a step of wirelessly transmitting the wireless communication setting information to the external terminal that has transmitted a read request in response to the read request when the read request to read the wireless communication setting information transmitted from the external terminal is detected by an RFID module that is configured to store wireless communication setting information which is used for the external terminal to perform wireless communication with the wireless communication module and data presence/absence information indicating presence/absence of the transmission target data, and a step of outputting a signal by the RFID module to one of the control unit and the power supply control unit when the read request is detected and the data presence/absence information indicating the presence of the transmission target data is stored while the wireless communication module is operating in the second state, the signal causing the state of the wireless communication module to transition from the second state to the first state.

According to a fifteenth aspect of the present invention, a device storing a program to execute: a wireless communication step of wirelessly transmitting transmission target data when a wireless communication module operates in a first state, the wireless communication module being configured to operate in one of a first state in which wireless communication with an external terminal is performed through a layer higher than a data link layer and a second state in which the wireless communication with the external terminal is not performed through the layer higher than the data link layer or electric power supply used to perform wireless communication with the external terminal through the data link layer is not performed, a power supply control step of controlling power supply of a power supply unit configured to perform the electric power supply to the wireless communication module, a control step of setting parameters of the layer higher than the data link layer to parameters of the wireless communication module, a step of wirelessly transmitting the wireless communication setting information to the external terminal that has transmitted a read request in response to the read request when the read request to read the wireless communication setting information transmitted from the external terminal is detected by an RFID module that is configured to store wireless communication setting information which is used for the external terminal to perform wireless communication with the wireless communication module and data presence/absence information indicating presence/absence of the transmission target data, and a step of outputting a signal by the RFID module to one of the control unit and the power supply control unit when the read request is detected and the data presence/absence information indicating the presence of the transmission target data is stored while the wireless communication module is operating in the second state, the signal causing the state of the wireless communication module to transition from the second state to the first state.

BRIEF DESCRIPTION OF THE DRAWINGS

FIG. 9 is a schematic diagram showing a data structure of communication setting information and a transmission target data list according to a second embodiment of the present invention;

FIG. 12 is a schematic diagram showing a data structure of communication setting information and a transmission target data list according to a third embodiment of the present invention;

DETAILED DESCRIPTION OF THE INVENTION

First Embodiment

Figure 1:
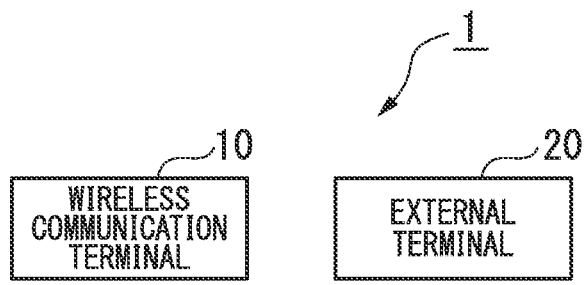
FIG. 1 is a schematic diagram showing a configuration of a wireless communication system according to a first embodiment of the present invention.

Hereinafter, a first embodiment of the present invention will be described with reference to the appended drawings. FIG. 1 is a schematic diagram showing the configuration of a wireless communication system according to the present first embodiment. A wireless communication system 1 includes a wireless communication terminal 10 and an external terminal 20. The wireless communication terminal 10 is, for example, a digital camera having a wireless communication function, and transmits data such as an image to the external terminal 20.

The external terminal 20 is, for example, a smartphone, and receives data such as an image from the wireless communication terminal 10.

Figure 2:
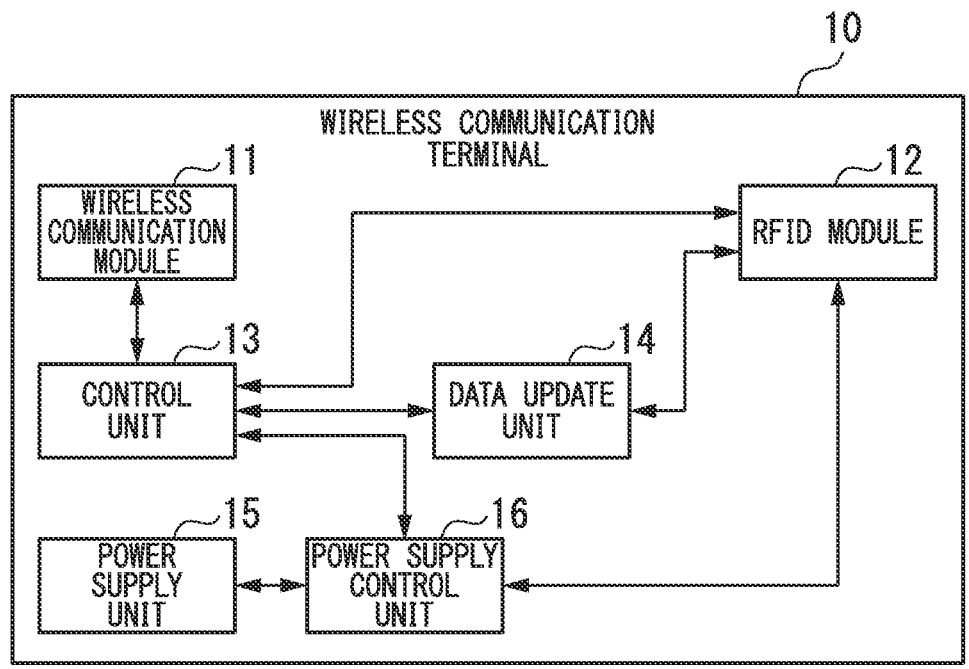
FIG. 2 is a block diagram showing a minimum configuration of a wireless communication terminal according to the first embodiment of the present invention.

Next, the configuration of the wireless communication terminal 10 will be described. FIG. 2 is a block diagram showing a minimum configuration of the wireless communication terminal 10 according to the present embodiment. In the example illustrated in FIG. 2, the wireless communication terminal 10 includes a wireless communication module 11, a Radio Frequency Identification (RFID) module 12, a control unit 13, a data update unit 14, a power supply unit 15, and a power supply control unit 16. The wireless communication module 11, the RFID module 12, the control unit 13, the data update unit 14, the power supply unit 15, and the power supply control unit 16 are configurations essential to the present invention.

The wireless communication module 11 performs transmission and reception of data such as an image, for example, using a wireless LAN. In the present embodiment, IEEE802.11 is assumed as an example of a wireless LAN. The RFID module 12 stores communication setting information to be set to a parameter of the external terminal 20 and transmission data presence/absence information indicating whether or not there is transmission target data to be transmitted the external terminal 20. The RFID module 12 transmits the stored communication setting information and the transmission data presence/absence information to the external terminal 20 using the RFID technology. In the present embodiment, 13.56 MHz is assumed to be the frequency used for communication in the RFID module 12.

The control unit 13 sets a parameter for the wireless communication module 11. The parameter refers to a parameter of a layer higher than the data link layer related to the OSI reference model (the model standardized as ISO 7498) such as an IP address or/and security settings. The wireless communication module 11 performs packet processing in the data link layer based on the set parameter through the control unit 13. The data update unit 14 updates the communication setting information and the transmission data presence/absence information stored in the RFID module 12

The power supply unit 15 supplies electric power supply to each of the units equipped in the wireless communication terminal 10. The power supply control unit 16 controls the power supply unit 15 so as to determine the destination of the electric power supply. Specifically, the power supply control unit 16 acquires a voltage value of a battery or/and the like equipped in the power supply unit 15. The power supply control unit 16 notifies the control unit 13 of the acquired voltage value of the battery or/and the like, and performs enable/disable control on each power integrated circuit (IC) according to a battery voltage or/and a voltage of each power IC. Further, the power supply control unit 16 controls electric power supply supply/interruption on each block of the wireless communication terminal 10 according to an activation signal from a tag control unit 121 (FIG. 3) of the RFID module 12 or the user's operation.

In other words, there are an active state (first state) in which wireless data communication is possible and a standby state (second state) in which wireless communication is disabled as operation states of the wireless communication module 11. The standby state is an OFF state or a sleep state. The OFF state is a complete OFF state in which electric power supply is not performed to an electric circuit of the wireless communication module 11 at all and a clock is also stopped. The sleep state is a state in which electric power supply is being performed to the wireless communication module 11 to operate a clock having a lower speed than in the first state, and transitions to the first state when the activation signal is received from the control unit 13 of the wireless communication terminal 10. In the sleep state, the wireless communication module 11 does not output radio waves such as a beacon signal. The wireless communication module 11 transitions from the standby state to the active state in response to the activation signal from the control unit 13 of the wireless communication terminal 10.

The second state may be a state in which electric power supply is performed to the wireless communication module 11, and when the second state has a longer beacon output interval than the first state, even when a wireless module receives a connection request in response to an output beacon, there is no response to the connection request at a level higher than the data link layer (for example, the MAC layer) in the OSI reference model (the model standardized as ISO 7498). The first state may be a state in which data communication is possible at a level of the application layer (for example, the HTTP layer) from the network layer (for example, the IP layer) in the OSI reference model.

Further, when the wireless communication module 11 is in the first state and the power supply control unit 16 receives the activation signal from the RFID module 12, the power supply control unit 16 performs control such that the wireless communication module 11 remains in the first state. In other words, the power supply control unit 16 causes the power IC for the wireless communication module 11 to remain in the enable state and does not cause it to enter the disable state. Further, when the wireless communication module 11 is in the first state, the control unit 13 causes the wireless communication module 11 to remain in the first state regardless of the activation signal from the RFID module 12 and does not cause it to transition to the second state.

Figure 3:
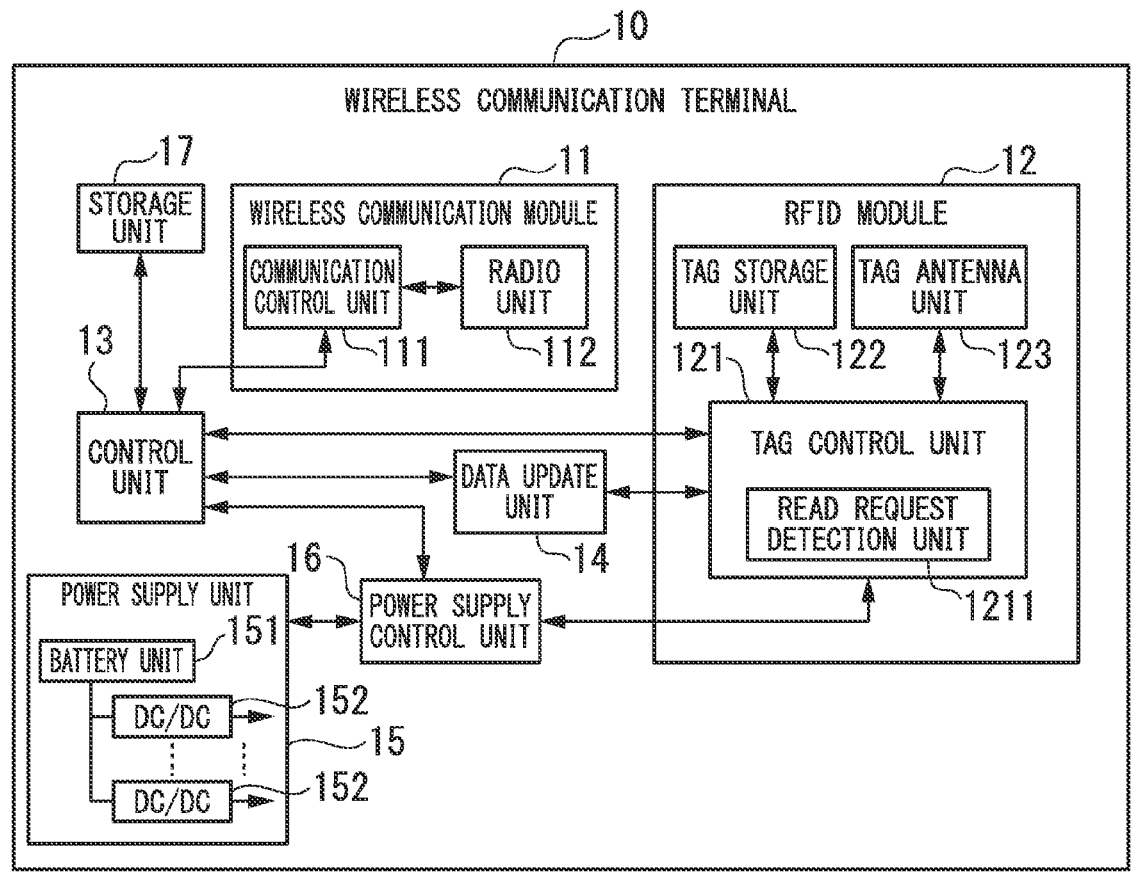
FIG. 3 is a block diagram showing a detailed configuration of the wireless communication terminal according to the first embodiment of the present invention.

Next, a detailed configuration of the wireless communication terminal 10 will be described. FIG. 3 is a block diagram showing a detailed configuration of the wireless communication terminal 10 according to the present embodiment. In the example illustrated in FIG. 3, the wireless communication terminal 10 includes the wireless communication module 11, the RFID module 12, the control unit 13, the data update unit 14, the power supply unit 15, the power supply control unit 16, and a storage unit 17. The wireless communication module 11, the RFID module 12, the control unit 13, the data update unit 14, the power supply unit 15, and the power supply control unit 16 have the above-described configurations.

The wireless communication module 11 includes a communication control unit 111 and a radio unit 112. The communication control unit 111 performs division and reconfiguration of transmission and reception packets of a digital signal which is input from the radio unit 112 or output to the radio unit 112, and performs reading or writing of data from or to the storage unit 17 through the control unit 13. The radio unit 112 is a radio-frequency unit including an antenna that transmits and receives radio waves of a different frequency from radio waves used by the RFID module 12. The radio unit 112 includes an interface that transmits or receives a digital signal to or from the communication control unit 111.

The RFID module 12 includes the tag control unit 121, a tag storage unit 122, and a tag antenna unit 123. The tag control unit 121 operates based on electromotive force generated by the tag antenna unit 123. The tag control unit 121 transmits a transmission signal or the response signal to the external terminal 20 through the tag antenna unit 123. In a transmission method of the tag control unit 121, data stored in the tag storage unit 122 is modulated by a certain modulation scheme and then transmitted to the external terminal 20. The certain modulation scheme is, for example, an ASK modulation scheme of changing intensity of a magnetic field generated from the tag antenna by changing a resistance value and changing an electric current flowing to the antenna.

The tag control unit 121 includes a read request detecting unit 1211. The read request detecting unit 1211 receives data from the external terminal 20, and detects that the communication setting information stored in the tag storage unit 122 has been read. When there is transmission target data in the tag storage unit 122, the read request detecting unit 1211 outputs the activation signal to the power supply control unit 16 or the control unit 13 of the wireless communication terminal 10. For example, when the activation signal is input to the power supply control unit 16 from the tag control unit 121, the power supply control unit 16 supplies electric power supply to the control unit 13. As a result, the control unit 13 causes the wireless communication module 11 to enter the active state. Further, when the activation signal is input to the control unit 13, the control unit 13 causes the wireless communication module 11 to enter the active state.

The tag storage unit 122 stores the communication setting information and the transmission data presence/absence information. The tag antenna unit 123 receives a high-frequency magnetic field (for example, 13.56 MHz) generated by the external terminal 20 and generates electromotive force by electromagnetic induction. Further, the tag antenna unit 123 transmits a response signal or a data signal generated by the tag control unit 121 to the external terminal 20.

The power supply unit 15 includes a battery unit 151 and a plurality of DC/DC converters 152. The battery unit 151 is, for example, a rechargeable battery, and supplies accumulated electric power supply. Each DC/DC converter 152 supplies or interrupts electric power supply to each block based on a control signal from the power supply control unit 16. The storage unit 17 stores a program of operating the wireless communication terminal 10. Further, the storage unit 17 stores transmission target data which is data such as image data to be transmitted to the external terminal 20. Further, the storage unit 17 performs data reading or writing according to an instruction from the control unit 13.

Figure 4:
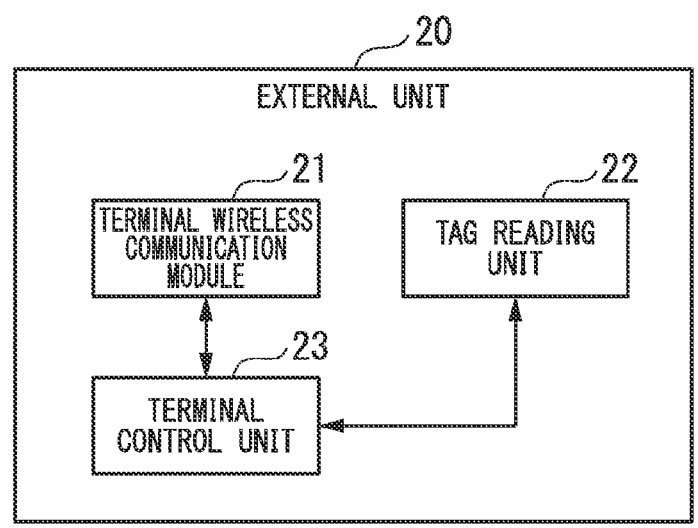
FIG. 4 is a block diagram showing a configuration of an external terminal according to the first embodiment of the present invention.

Next, a configuration of the external terminal 20 will be described. FIG. 4 is a block diagram showing a configuration of the external terminal 20 according to the present embodiment. In the example illustrated in FIG. 4, the external terminal 20 includes a terminal wireless communication module 21, a tag reading unit 22, and a terminal control unit 23. The terminal wireless communication module 21 performs transmission and reception of data such as an image, for example, using a wireless LAN. The tag reading unit 22 receives the communication setting information and the transmission data presence/absence information from the RFID module 12 of the wireless communication terminal 10. The terminal control unit 23 sets the communication setting information received from the wireless communication terminal 10 by the tag reading unit 22 to the terminal wireless communication module 21.

Figures 5, 6:
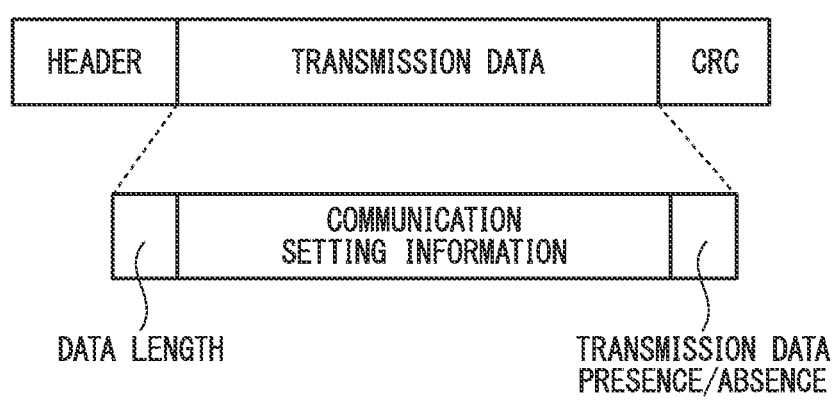
FIG. 5 is a schematic diagram showing a data structure of communication setting information and data presence/absence information according to the first embodiment of the present invention.
FIG. 6 is a schematic diagram showing a data structure of data to be transmitted by an RFID module according to the first embodiment of the present invention.

Next, the communication setting information and the data presence/absence information will be described. FIG. 5 is a schematic diagram showing a data structure of the communication setting information and the data presence/absence information according to the present embodiment. In the present embodiment, the tag storage unit 122 of the RFID module 12 stores the communication setting information and the data presence/absence information. The communication setting information includes a data item "MAC address," a data item "communication CH," a data item "IP address," a data item "security," a data item "SSID," a data item "subnet mask," and a data item "default gateway." The data presence/absence information includes a data item "data."

The data item "MAC address" stores a MAC address of the wireless communication module 11. The data item "communication CH" stores a channel (or a frequency) used by the wireless communication module 11. The data item "IP address" stores an IP address of the wireless communication module 11. The data item "security" stores a name of security used by the wireless communication module 11. When a key is used as the security used by the wireless communication module 11, the data item "security" stores a key as well.

The data item "SSID" stores a service set identifier (SSID) of the wireless communication module 11. The data item "subnet mask" stores a subnet mask of an IP address used by the wireless communication module 11. The data item "default gateway" stores a default gateway of the wireless communication module 11. The data item "data" stores data indicating the presence/absence of transmission target data. In the present embodiment, "1" is set as data indicating the presence of transmission target data, and "0" is set as data indicating the absence of transmission target data. A timing at which the data item "data" is updated from "0" to "1" is updated, for example, when image data is newly stored in the storage unit 17 of the wireless communication terminal 10. The details related to the update of the data item "data" will be described later.

In the example illustrated in FIG. 5, "AA:BB:CC:DD:FF:00:11" is stored in the data item "MAC address." "6" is stored in the data item "communication CH." "192.168.123.45" is stored in the data item "IP address." "Mode==WPA2 Key=12345ABCDE" is stored in the data item "security." "XYZ0123" is stored in the data item "SSID." "255.255.255.0" is stored in the data item "subnet mask." "192.168.123.45" is stored in the data item "default gateway." "1" is stored in the data item "data."

From the above storage content, the communication setting information illustrated in FIG. 5 shows the MAC address of the wireless communication module 11 as "AA:BB:CC:DD:FF:00:11." A channel used for communication by the wireless communication module 11 is shown as "6." The IP address of the wireless communication module 11 is shown as "192.168.123.45." The wireless communication module 11 is shown as using "WPA2" as the security, and a Key is shown as "12345ABCDE."

The SSID of the wireless communication module 11 is shown as "XYZ0123." The subnet mask of the wireless communication module 11 is shown as "255.255.255.0." The default gateway of the wireless communication module 11 is shown as "192.168.123.45." It is shown that there is transmission target data be transmitted from the wireless communication terminal 10 to the external terminal 20.

Next, a data structure of data to be transmitted by the RFID module 12 will be described. FIG. 6 is a schematic diagram showing a data structure of data to be transmitted by the RFID module 12 according to the present embodiment. In the example illustrated in FIG. 6, data to be transmitted by the RFID module 12 includes fields such as a header, transmission data, and a CRC. The header is a field used to transmit information (including a preamble) related to data to be transmitted by the RFID module 12. The transmission data is a field used to transmit a data length, the communication setting information, and the transmission data presence/absence information. The data length is information indicating the data length of the transmission data. The communication setting information and the transmission data presence/absence information have been described above with reference to FIG. 5. The CRC is a field used to transmit data used for a cyclic redundancy check (CRC). Information of each transmission target data list (for example, FIG. 9 which will be described later) may also be included in the field used to transmit the transmission data presence/absence information.

Figure 7:
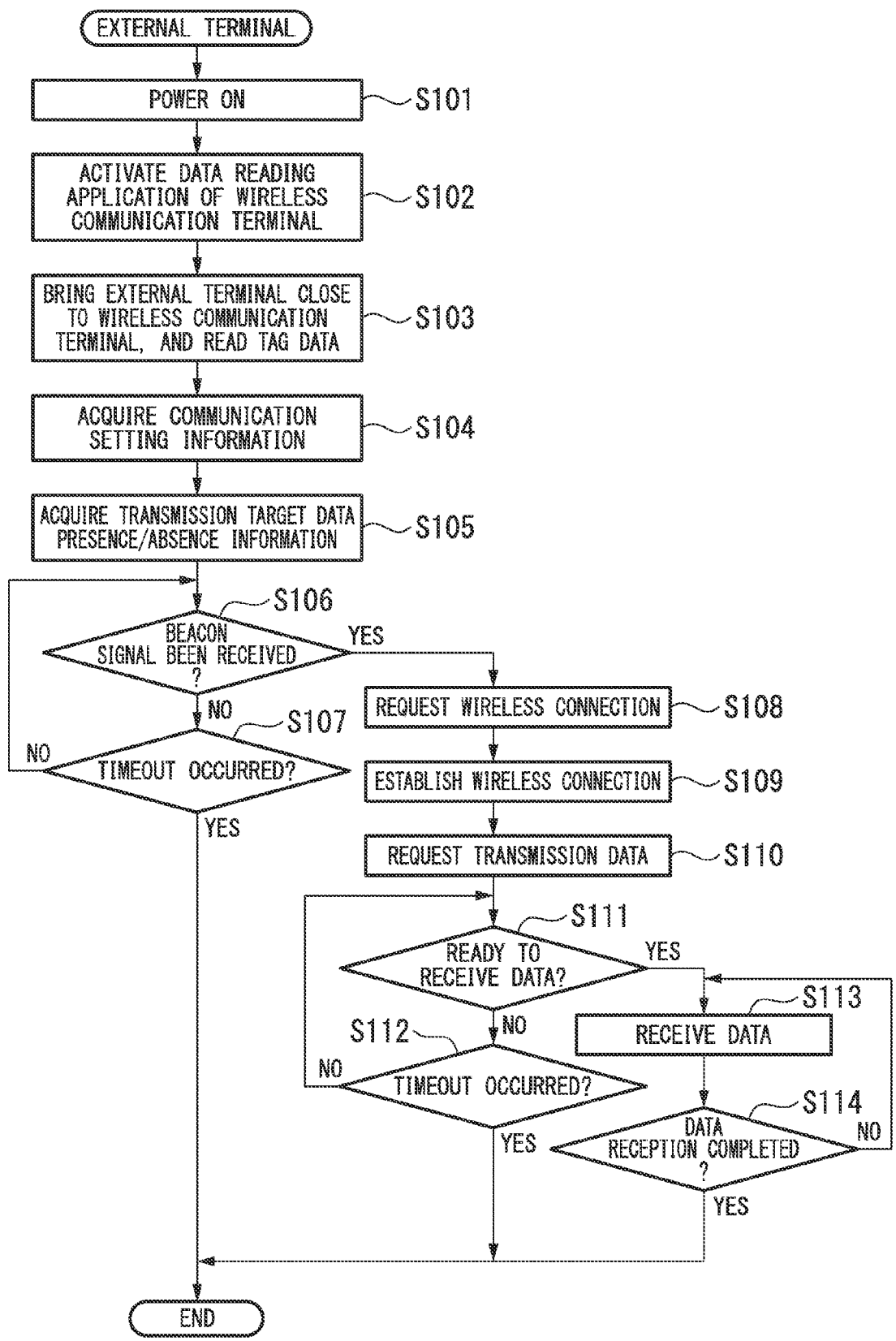
FIG. 7 is a flowchart showing an operation process of the external terminal when transmission and reception of data are performed between the wireless communication terminal and the external terminal according to the first embodiment of the present invention.

Next, an operation process when transmission and reception of data are performed between the wireless communication terminal 10 and the external terminal 20 will be described. FIG. 7 is a flowchart showing an operation process of the external terminal 20 when transmission and reception of data are performed between the wireless communication terminal 10 and the external terminal 20 according to the present embodiment.

(Step S101) The user turns on a power switch of the external terminal 20 when transmission and reception of data are performed between the wireless communication terminal 10 and the external terminal 20. When the power switch is turned on by the user, a terminal power supply unit 24 of the external terminal 20 starts to perform electric power supply to the respective components of the external terminal 20. Thereafter, the process proceeds to step S102.

(Step S102) The terminal control unit 23 activates a tag reading application stored in a terminal storage unit 25 in order to acquire the communication setting information from the wireless communication terminal 10. Thereafter, the process proceeds to step S103.

(Step S103) The user brings the tag reading unit 22 of the external terminal 20 closer to the tag antenna unit 123 of the wireless communication terminal 10. The tag reading unit 22 performs near field communication (NFC) with the tag antenna unit 123, and receives data stored in the tag storage unit 122. Thereafter, the process proceeds to step S104.

(Step S104) The terminal control unit 23 acquires the communication setting information from the data received in the process of step S103. Thereafter, the process proceeds to step S105.

(Step S105) The terminal control unit 23 acquires the data presence/absence information from the data received in the process of step S103. Thereafter, the process proceeds to step S106.

(Step S106) The wireless communication module 11 of the wireless communication terminal 10 transmits a beacon signal in the active state. When the wireless communication module 11 of the wireless communication terminal 10 has transmitted a beacon, the terminal wireless communication module 21 receives the beacon signal. The terminal control unit 23 determines whether or not the terminal wireless communication module 21 has received the beacon signal. When the terminal control unit 23 determines that the terminal wireless communication module 21 has received the beacon signal, the process proceeds to step S108. In any other case, the process proceeds to step S107.

(Step S107) The terminal control unit 23 determines whether or not a timeout has occurred, that is, whether or not a predetermined period of time has elapsed since the process of step S105 ended. When the terminal control unit 23 determines that a timeout has occurred, the process ends. In any other case, the process returns to step S106.

(Step S108) The terminal wireless communication module 21 transmits a connection request signal to the wireless communication module 11 of the wireless communication terminal 10 based on the communication setting information acquired in the process of step S105. Thereafter, the process proceeds to step S109.

(Step S109) The terminal wireless communication module 21 establishes a wireless connection with the wireless communication module 11 of the wireless communication terminal 10. Thereafter, the process proceeds to step S110.

(Step S110) The terminal wireless communication module 21 transmits a transmission request message to request transmission target data to the wireless communication module 11 of the wireless communication terminal 10. Thereafter, the process proceeds to step S111.

(Step S111) Upon receiving the transmission request message, the wireless communication module 11 of the wireless communication terminal 10 transmits the transmission target data to the terminal wireless communication module 21 serving as the transmission resource of the transmission request message. The terminal control unit 23 determines whether or not the terminal wireless communication module 21 has received the transmission target data transmitted from the wireless communication module 11 of the wireless communication terminal 10. When the terminal control unit 23 determines that the transmission target data has been received, the process proceeds to step S113. In any other case, the process proceeds to step S112.

(Step S112) The terminal control unit 23 determines whether or not a timeout has occurred, that is, whether or not a predetermined period of time has elapsed since the process of step S110 ended. When the terminal control unit 23 determines that a timeout has occurred, the process ends. In any other case, the process returns to step S111.

(Step S113) The terminal wireless communication module 21 receives the transmission target data transmitted from the wireless communication module 11 of the wireless communication terminal 10. Thereafter, the process proceeds to step S114.

(Step S114) The terminal control unit 23 determines whether or not the terminal wireless communication module 21 has completed the reception of the transmission target data. When the terminal control unit 23 determines that the reception of the transmission target data has been completed, the process ends. In any other case, the process returns to step S113.

Figure 8:
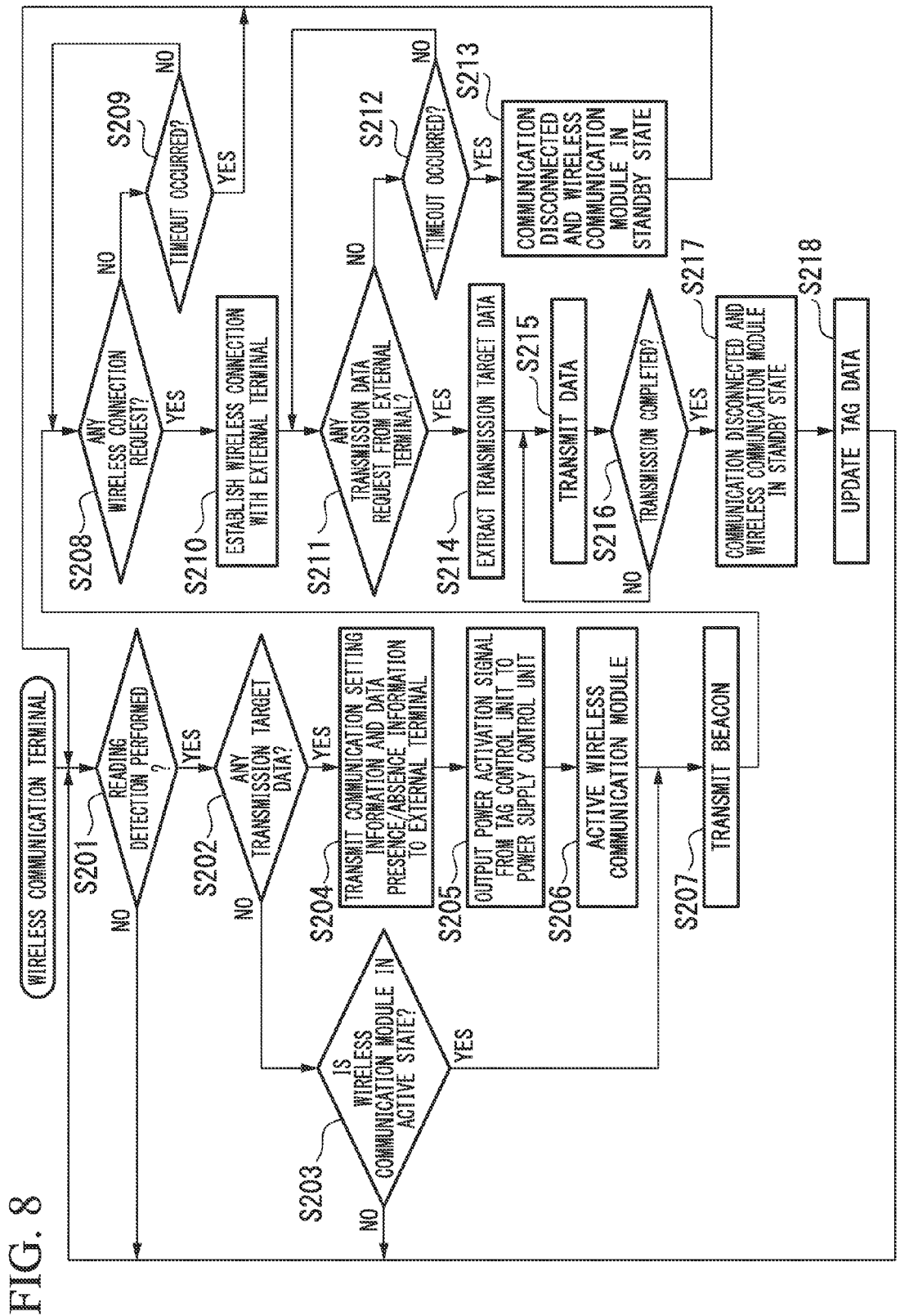
FIG. 8 is a flowchart showing an operation process of the wireless communication terminal when transmission and reception of data are performed between the wireless communication terminal and the external terminal according to the first embodiment of the present invention.

FIG. 8 is a flowchart showing an operation process of the wireless communication terminal 10 when transmission and reception of data are performed between the wireless communication terminal 10 and the external terminal 20 according to the present embodiment.

(Step S201) When the tag antenna unit 123 receives a high-frequency magnetic field for reading the RFID module 12 from the external terminal 20, the tag control unit 121 is driven by electromotive force generated in the tag antenna unit 123, and the read request detecting unit 1211 performs reading detection of the RFID module 12. The control unit 13 determines whether or not the read request detecting unit 1211 has performed the reading detection. When the control unit 13 determines that the reading detection has been performed, the process proceeds to step S202. In any other case, the process returns to step S201.

(Step S202) The tag control unit 121 reads the data presence/absence information stored in the tag storage unit 122, and determines whether or not there is transmission target data. When the tag control unit 121 determines that there is transmission target data, the process proceeds to step S204. In any other case, the process proceeds to step S203.

(Step S203) The control unit 13 determines whether or not the wireless communication module 11 is in the active state (the first state). When the control unit 13 determines that the wireless communication module 11 is in the active state, the process proceeds to step S207. In any other case, the process returns to step S201.

(Step S204) The RFID module 12 transmits data including the communication setting information and the data presence/absence information stored in the tag storage unit 122 to the tag reading unit 22 of the external terminal 20. Thereafter, the process proceeds to step S205.

(Step S205) The tag control unit 121 outputs the activation signal for instructing supply of electric power supply to the wireless communication module 11 to the power supply control unit 16. Thereafter, the process proceeds to step S206.

(Step S206) Since the activation signal has been input in the process of step S205, the power supply control unit 16 controls the power supply unit 15, and starts to supply electric power supply to the wireless communication module 11. The wireless communication module 11 enters the active state (the first state) as the electric power supply is performed. Thereafter, the process proceeds to step S207.

(Step S207) The wireless communication module 11 enters the active state and thus transmits the beacon signal. Thereafter, the process proceeds to step S208.

(Step S208) When performing wireless communication with the wireless communication terminal 10, the terminal wireless communication module 21 of the external terminal 20 transmits the connection request signal to the wireless communication module 11 of the wireless communication terminal 10. When the connection request signal is transmitted, the wireless communication module 11 receives the connection request signal. The control unit 13 determines whether or not the wireless communication module 11 has received the connection request signal. When the control unit 13 determines that the connection request signal has been received, the process proceeds to step S210. In any other case, the process proceeds to step S209.

(Step S209) The control unit 13 determines whether or not a timeout has occurred (whether or not a predetermined period of time has elapsed since the process of step S207 ended). When the control unit 13 determines that a timeout has occurred, the process returns to step S201. In any other case, the process returns to step S208.

(Step S210) The wireless communication module 11 establishes a wireless connection with the terminal wireless communication module 21 of the external terminal 20 based on the connection request signal received in the process of step S208. Thereafter, the process proceeds to step S211.

(Step S211) When a transmission request to request the wireless communication terminal 10 to transmit a transmission target data is made, the terminal wireless communication module 21 of the external terminal 20 transmits the transmission request message to the wireless communication module 11 of the wireless communication terminal 10. When the transmission request message has been transmitted, the wireless communication module 11 receives the transmission request message. The control unit 13 determines whether or not the wireless communication module 11 has received the transmission request message. When the control unit 13 determines that the transmission request message has been received, the process proceeds to step S214. In any other case, the process proceeds to step S212.

(Step S212) The control unit 13 determines whether or not a timeout has occurred, that is, whether or not a predetermined period of time has elapsed since the process of step S210 ended. When the control unit 13 determines that a timeout has occurred, the process proceeds to step S213. In any other case, the process returns to step S211.

(Step S213) The control unit 13 disconnects the communication connection between the wireless communication module 11 and the terminal wireless communication module 21 of the external terminal 20. The control unit 13 outputs a suspension signal to instruct suspension of electric power supply to the wireless communication module 11 to the power supply control unit 16.

Since the suspension signal has been input, the power supply control unit 16 controls the power supply unit 15 such that supply of electric power supply to the wireless communication module 11 is suspended. As supply of electric power supply is suspended, the wireless communication module 11 enters the standby state (the second state). Thereafter, the process returns to step S201.

(Step S214) The control unit 13 extracts the transmission target data stored in the storage unit 17. Thereafter, the process proceeds to step S215.

(Step S215) The wireless communication module 11 transmits the transmission target data extracted by the control unit 13 in the process of step S214 to the terminal wireless communication module 21 of the external terminal 20. Thereafter, the process proceeds to step S216.

(Step S216) The control unit 13 determines whether or not the wireless communication module 11 has completed the transmission of the transmission target data. When the control unit 13 determines that the transmission of the transmission target data has been completed, the process proceeds to step S217. In any other case, the process returns to step S215.

(Step S217) The control unit 13 disconnects the communication connection between the wireless communication module 11 and the terminal wireless communication module 21 of the external terminal 20. Further, the control unit 13 outputs a suspension signal to instruct suspension of electric power supply to the wireless communication module 11 to the power supply control unit 16.

Since the suspension signal has been input, the power supply control unit 16 controls the power supply unit 15 such that supply of electric power supply to the wireless communication module 11 is suspended. As supply of electric power supply is suspended, the wireless communication module 11 enters the standby state (the second state). Thereafter, the wireless communication terminal 10 proceeds to the process of step S218.

(Step S218) Since all transmission target data has been transmitted in the process of step S215, the data update unit 14 updates a value of the data item "data" of the data presence/absence information stored in the tag storage unit 122 to "0" (the absence of transmission target data). Thereafter, the process returns to step S201.

Through the above-described process, according to the present embodiment, as the tag reading unit 22 of the external terminal 20 simply reads information from the RFID module 12 of the wireless communication terminal 10, it is possible to cause the wireless communication module 11 to automatically enter the active state only when necessary, and it is possible to automatically transmit necessary data. Further, after data transmission, the wireless communication module 11 automatically returns to the standby state. Thus, the user operating the external terminal 20 can acquire desired data without operating the wireless communication terminal 10.

Further, through the above-described process, according to the present embodiment, even in the case in which the tag reading unit 22 of the external terminal 20 has read information from the RFID module 12 of the wireless communication terminal 10, when there is no transmission target data, the wireless communication module 11 is not activated, and thus unnecessary power consumption can be prevented.

Second Embodiment

Next, a second embodiment of the present invention will be described. A difference between the present embodiment and the first embodiment lies in that a transmission target data list listing transmission target data is used instead of the data presence/absence information. The wireless communication system 1, the wireless communication terminal 10, and the external terminal 20 have the same configuration as in the first embodiment.

FIG. 9 is a schematic diagram showing a data structure of the communication setting information and the transmission target data list according to the present embodiment. According to the present embodiment, the tag storage unit 122 of the RFID module 12 stores the communication setting information in association with the transmission target data list. The communication setting information is the same as in the first embodiment.

The transmission target data list includes a data item "MAC address," a data item "data," and a data item "access path" for each target device. The data item "MAC address" stores the MAC address of the terminal wireless communication module 21 of the external terminal 20. The data item "data" stores data indicating the presence/absence of transmission target data. In the present embodiment, "1" is set as data indicating the presence of transmission target data, and "0" is set as data indicating the absence of transmission target data. The data item "access path" stores an access path of transmission target data stored in the storage unit 17 of the wireless communication terminal 10.

In the example illustrated in FIG. 9, "01:23:45:67:89:AB" is stored in the data item "MAC address" of a first target device. Further, "1" is stored in the data item "data" of the first target device. Further, "¥DCIM¥..¥ABC0001.JPG," "¥DCIM¥..¥ABC0008.JPG," "¥DCIM¥..¥ABC0011.JPG," and "¥DCIM¥..¥ABC0012.JPG" are stored in the data item "access path" of the first target device.

The above-described storage content indicates that the first target device in the transmission target data list illustrated in FIG. 9 has transmission target data for the external terminal 20 specified by the MAC address "01:23:45:67:89:AB," and the access path of the transmission target data is "¥DCIM¥..¥ABC0001.JPG," "¥DCIM¥..¥ABC0008.JPG," "¥DCIM¥..¥ABC0011.JPG," and "¥DCIM¥..¥ABC0012.JPG."

Further, in the example illustrated in FIG. 9, "98:76:54:DD:FF:00:11" is stored in the data item "MAC address" of the second target device. Further, "0" is stored in the data item "data" of the second target device. From the above-described storage content, it is shown that the second target device in the transmission target data list illustrated in FIG. 9 does not have transmission target data for the external terminal 20 specified by the MAC address "98:76:54:DD:FF:00:11."

Further, in the example illustrated in FIG. 9, "CD:AB:EF:33:22:11" is stored in the data item "MAC address" of the third target device. "1" is stored in the data item "data" of the third target device. "¥DCIM¥..¥ABC0012.JPG," and "¥DCIM¥..¥ABC0015.JPG" are stored in the data item "access path" of the third target device.

From the above-described storage content, it is understood that the third target device in the transmission target data list illustrated in FIG. 9 has transmission target data for the external terminal 20 specified by the MAC address "CD:AB:EF:33:22:111," and the access path of the transmission target data is "¥DCIM¥..¥ABC0012.JPG" and "¥DCIM¥..¥ABC0015.JPG".

Further, in the example illustrated in FIG. 9, "Unknown" is stored in the data item "MAC address" of the fourth target device. Further, "1" is stored in the data item "data" of the fourth target device. Further, "¥DCIM¥..¥*.JPG" is stored in the data item "access path" of the fourth target device.

The above-described storage content indicates that the fourth target device in the transmission target data list illustrated in FIG. 9 has transmission target data for the external terminal 20 other than the external terminals 20 specified by the data items "MAC address" of the target devices of the transmission target data list, and the access path of the transmission target data is "¥DCIM¥..¥*.JPG".

In other words, it is shown that there is transmission target data other than the external terminal 20 specified by the MAC address "01:23:45:67:89:AB," the external terminal 20 specified by the MAC address "98:76:54:DD:FF:00:11," and the external terminal 20 specified by the MAC address "CD:AB:EF:33:22:11," and the access path of the transmission target data is "¥DCIM¥..¥*.JPG," that is, all files which are stored in "¥DCIM¥..¥" and have "JPG" as an extension.

Figure 10:
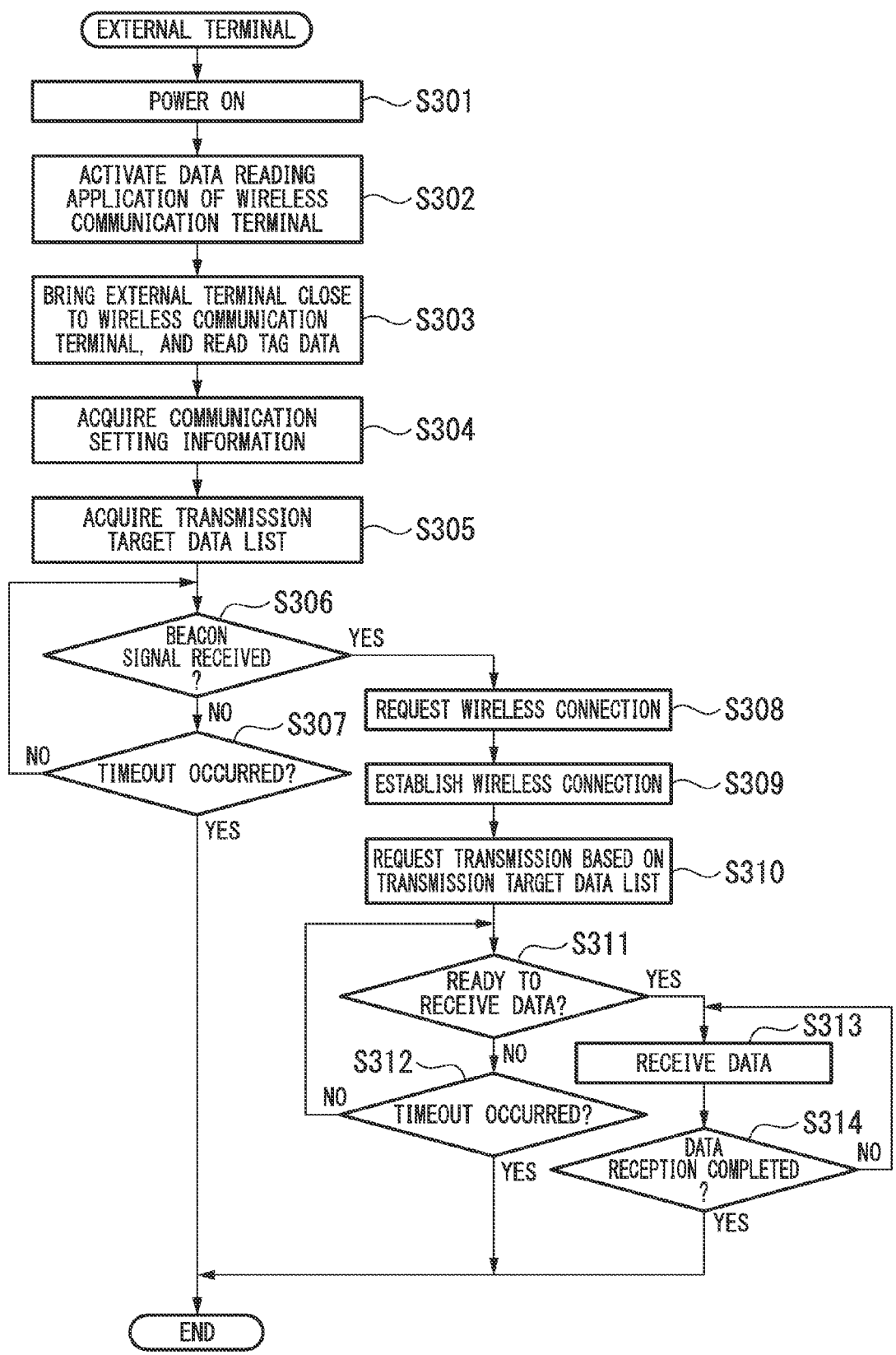
FIG. 10 is a flowchart showing an operation process of the external terminal when transmission and reception of data are performed between the wireless communication terminal and the external terminal according to the second embodiment of the present invention.

Next, an operation process when transmission and reception of data are performed between the wireless communication terminal 10 and the external terminal 20 will be described. FIG. 10 is a flowchart showing an operation process of the external terminal 20 when transmission and reception of data are performed between the wireless communication terminal 10 and the external terminal 20 according to the present embodiment.

The process of steps S301 to S304 is the same as the process of steps S101 to S103 in the first embodiment.

(Step S305) The terminal control unit 23 acquires a transmission target data list from the data received in the process of step S303. Thereafter, the process proceeds to step S306.

The process of steps S306 to S309 is the same as the process of steps S106 to S109 in the first embodiment.

(Step S310) The terminal wireless communication module 21 transmits a transmission request message to request transmission target data written in the data item "access path" of the target device corresponding to the MAC address of its own device in the transmission target data list acquired in the process of step S305 to the wireless communication module 11 of the wireless communication terminal 10. Thereafter, the process proceeds to step S311. The terminal wireless communication module 21 may transmit a transmission request message to request all transmission target data written in the data item "access path" of the target device corresponding to the MAC address of its own device. Further, the terminal wireless communication module 21 may transmit a transmission request message to request some transmission target data designated by the user among transmission target data written in the data item "access path" of the target device corresponding to the MAC address of its own device. The terminal wireless communication module 21 does not transmit the transmission request message when the data item "data" of the target device corresponding to the MAC address of its own device is 0.

The process of steps S311 to S314 is the same as the process of steps S111 to S114 in the first embodiment.

Figure 11:
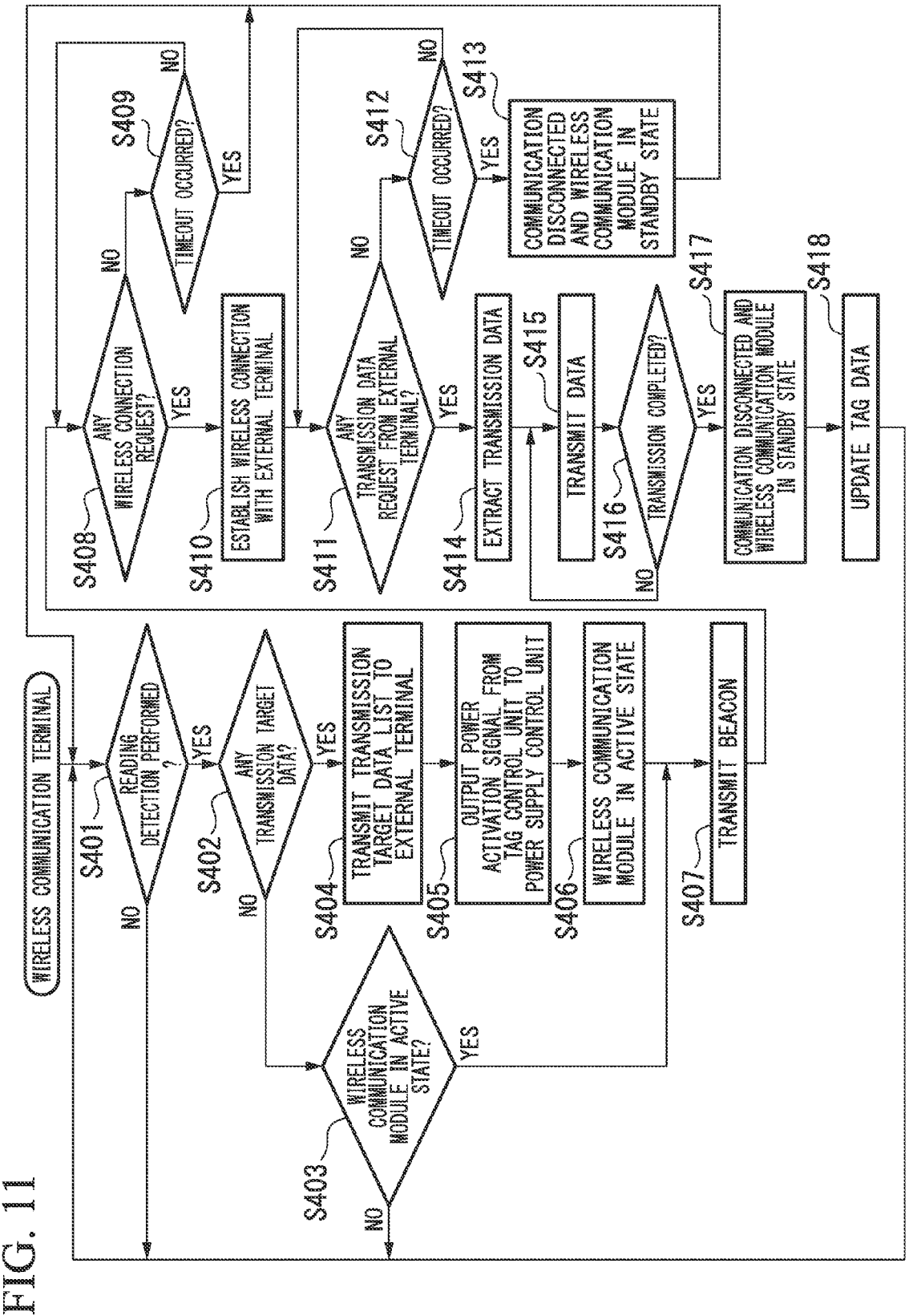
FIG. 11 is a flowchart showing an operation process of the wireless communication terminal when transmission and reception of data are performed between the wireless communication terminal and the external terminal according to the second embodiment of the present invention.

FIG. 11 is a flowchart showing an operation process of the wireless communication terminal 10 when transmission and reception of data are performed between the wireless communication terminal 10 and the external terminal 20 according to the present embodiment.

The process of step S401 is the same as the process of step S201 in the first embodiment.

(Step S402) The tag control unit 121 reads the transmission target data list stored in the tag storage unit 122, and determines whether or not there is transmission target data. When the tag control unit 121 determines that there is transmission target data, the process proceeds to step S404. In any other case, the process proceeds to step S403.

(Step S403) The control unit 13 determines whether or not the wireless communication module 11 is in the active state (the first state). When the control unit 13 determines that the wireless communication module 11 is in the active state, the process proceeds to step S407. In any other case, the process returns to step S401.

(Step S404) The RFID module 12 transmits data including the communication setting information and the transmission target data list stored in the tag storage unit 122 to the tag reading unit 22 of the external terminal 20. Thereafter, the process proceeds to step S405.

The process of steps S405 to S410 is the same as the process of steps S205 to S210 in the first embodiment.

(Step S411) When a transmission request to request the wireless communication terminal 10 to transmit transmission target data is made, the terminal wireless communication module 21 of the external terminal 20 transmits a transmission request message to request transmission target data written in the data item "access path" of the target device corresponding to the MAC address of its own device in the transmission target data list. When the transmission request message has been transmitted, the wireless communication module 11 receives the transmission request message. The control unit 13 determines whether or not the wireless communication module 11 has received the transmission request message. When the control unit 13 determines that the transmission request message has been received, the process proceeds to step S414. In any other case, the process proceeds to step S412.

The process of steps S412 to S413 is the same as the process of steps S212 to S213 in the first embodiment.

(Step S414) The control unit 13 extracts the transmission target data designated by the transmission request message received in the process of step S411 in the transmission target data stored in the storage unit 17. Thereafter, the process proceeds to step S415.

The process of steps S415 to S418 is the same as the process of steps S215 to S218 in the first embodiment.

Through the above-described process, according to the present embodiment, as the tag reading unit 22 of the external terminal 20 simply reads information from the RFID module 12 of the wireless communication terminal 10, it is possible to cause the wireless communication module 11 to automatically enter the active state only when necessary, and it is possible to automatically transmit necessary data. Further, since the wireless communication module 11 automatically returns to the standby state after data transmission, the user operating the external terminal 20 can acquire desired data without operating the wireless communication terminal 10.

Through the above-described process, according to the present embodiment, even in the case in which the tag reading unit 22 of the external terminal 20 has read information from the RFID module 12 of the wireless communication terminal 10, when there is no transmission target data, the wireless communication module 11 is not activated, and thus unnecessary power consumption can be prevented.

Through the above-described process, the tag reading unit 22 and the RFID module 12 exchange the transmission target data list before a wireless communication connection is established between the wireless communication module 11 and the terminal wireless communication module 21, and thus it is possible to select the transmission target data list which is desired to be received among transmission target data stored in the storage unit 17. Since transmission and reception of unnecessary transmission target data is not performed, unnecessary power consumption can be prevented.

In addition, since transmission and reception of the transmission target data list is performed between the tag reading unit 22 and the RFID module 12 instead of between the wireless communication module 11 and the terminal wireless communication module 21 which are high in power consumption, it can contribute to power consumption reduction.

Third Embodiment

Next, a third embodiment of the present invention will be described. A difference between the present embodiment and the second embodiment lies in that it is determined whether or not there is transmission target data for each external terminal 20 to which the transmission target data list is transmitted, and the wireless communication module 11 does not enter the active state when there is no transmission target data. Further, another difference lies in that information of transmission target data is included in the transmission target data list of the present embodiment. The wireless communication system 1, the wireless communication terminal 10, and the external terminal 20 according to the present embodiment have the same configuration as in the first embodiment.

FIG. 12 is a schematic diagram showing a data structure of the communication setting information and the transmission target data list according to the present embodiment. In the present embodiment, the tag storage unit 122 of the RFID module 12 stores the communication setting information in association with the transmission target data list. The communication setting information according to the present embodiment is the same as in the first embodiment.

The transmission target data list includes a data item "MAC address", a data item "data", a data item "access path", a data item "EXIF information", and a data item "DPOF" for each target device. The data item "MAC address" stores the MAC address of the terminal wireless communication module 21 of the external terminal 20. The data item "data" stores data indicating the presence/absence of the transmission target data. In the present embodiment, "1" is set as data indicating the presence of transmission target data, and "0" is set as data indicating the absence of transmission target data. The data item "access path" stores the access path of the transmission target data stored in the storage unit 17 of the wireless communication terminal 10.

The data item "EXIF information" stores information of transmission target data. In the example illustrated in FIG. 12, the EXIF information includes "shooting date and time," "manufacturer name," "model name," and "shooting position information." The data item "DPOF" stores a digital print order format (DPOF).

In the example illustrated in FIG. 12, "CD:AB:EF:33:22:11" is stored in the data item "MAC address" of the first target device. "1" is stored in the data item "data" of the first target device. "¥DCIM¥..*ABC0012.JPG" and "¥DCIM¥..¥ABC0015.JPG" are stored in the data item "access path" of the first target device.

"2009_01-2009_12¥List¥date_2009.xml" and "2010_01-2020_12¥List¥date_2009.xml" are stored in the "shooting date and time" of the data item "EXIF information" of the first target device. "OLYMPUS ¥List¥OLY.xml" is stored in the "manufacturer name" of the data item "EXIF information" of the first target device. "A0001 ¥List¥Model_A0001.xml" and "B0123 ¥List¥Model_B0123.xml" are stored in the "model name" of the data item "EXIF information" of the first target device.

Further, "Kyoto ¥List¥Place¥Kyoto.xml," "Osaka ¥List¥Place¥Osaka.xml," and "California ¥List¥Place¥California.xml" are stored in the "shooting position information" of the data item "EXIF information" of the first target device. "¥DCIM¥..¥ABC0012.JPG" is stored in the data item "DPOF" of the first target device.

The above-described storage content indicates that the first target device in the transmission target data list illustrated in FIG. 12 has transmission target data for the external terminal 20 specified by the MAC address "CD:AB:EF:33:22:11," and the access path of the transmission target data is "¥DCIM¥..¥ABC0012.JPG" and "¥DCIM¥..¥ABC0015.JPG".

In the EXIF information of the transmission target data "¥DCIM¥..¥ABC0012.JPG" and "¥DCIM¥..¥ABC0015.JPG," the "shooting date and time" is shown as "2009_01-2009_12 ¥List¥date_2009.xml" and "2010_01-2020_12 ¥List¥date_2009.xml," the "manufacturer name" of the shooting camera is shown as "OLYMPUS ¥List¥OLY.xml," the "model name" of the shooting camera is shown as "A0001 ¥List¥Model_A0001.xml" and "B0123 ¥List¥Model_B0123.xml," and the "shooting position information" is shown as "Kyoto ¥List¥Place¥Kyoto.xml," "Osaka ¥List¥Place¥Osaka.xml," and "California ¥List¥Place¥California.xml." Further, transmission target data of a print target is shown as "¥DCIM¥..¥ABC0012.JPG."

In the example illustrated in FIG. 12, "Unknown" is stored in the data item "MAC address" of the second target device. "1" is stored in the data item "data" of the second target device. "¥DCIM¥..¥*.JPG" is stored in the data item "access path" of the second target device.

"2009_01-2009_12 ¥List¥date_2009.xml" and "2010_01-2020_12 ¥List¥date_2009.xml" are stored in the "shooting date and time" of the data item "EXIF information" of the second target device. "OLYMPUS ¥List¥OLY.xml" is stored in the "manufacturer name" of the data item "EXIF information" of the second target device. "A0001 ¥List¥Model_A0001.xml" and "B0123 ¥List¥Model_B0123.xml" are stored in "model name" of the data item "EXIF information" of the second target device.

"Kyoto ¥List¥Place¥Kyoto.xml," "Osaka ¥List¥Place¥Osaka.xml," and "California ¥List¥Place¥California.xml" are stored in the "shooting position information" of the data item "EXIF information" of the second target device. "¥DCIM¥..¥ABC0001.JPG," "¥DCIM¥..¥ABC0008.JPG," "¥DCIM¥..¥ABC0011 JPG," and "¥DCIM¥..¥ABC0020.JPG" are stored in the data item "DPOF" of the second target device.

The above-described storage content indicates that the second target device in the transmission target data list illustrated in FIG. 12 has transmission target data for the external terminal 20 other than the external terminal 20 specified by the data item "MAC address" of each target device in the transmission target data list, and the access path of the transmission target data is "¥DCIM¥..¥*.JPG."

In other words, it is shown that there is transmission target data for the external terminal 20 other than the external terminal 20 specified by the MAC address "CD:AB:EF:33:22:11," and the access path of the transmission target data is stored in "¥DCIM¥..¥*.JPG," that is, all files which are stored in "¥DCIM¥..¥" and have "JPG" as an extension.

Further, in the EXIF information of the transmission target data "¥DCIM¥..¥*.JPG," the "shooting date and time" is shown as "2009_01-2009_12 ¥List¥date_2009.xml" and "2010_01-2020_12 ¥List¥date_2009.xml," the "manufacturer name" of the shooting camera is shown as "OLYMPUS ¥List¥OLY.xml," the "model name" of the shooting camera is shown as "A0001 ¥List¥Model_A0001.xml" and "B0123 ¥List¥Model_B0123.xml," and the "shooting position information" is shown as "Kyoto ¥List¥Place¥Kyoto.xml," "Osaka ¥List¥Place¥Osaka.xml," and "California ¥List¥Place¥California.xml." Further, transmission target data of a print target is shown as "¥DCIM¥..¥ABC0001.JPG," "¥DCIM¥..¥ABC0008.JPG," "¥DCIM¥..¥ABC0011.JPG," and "¥DCIM¥..¥ABC0020.JPG."

Figure 13:
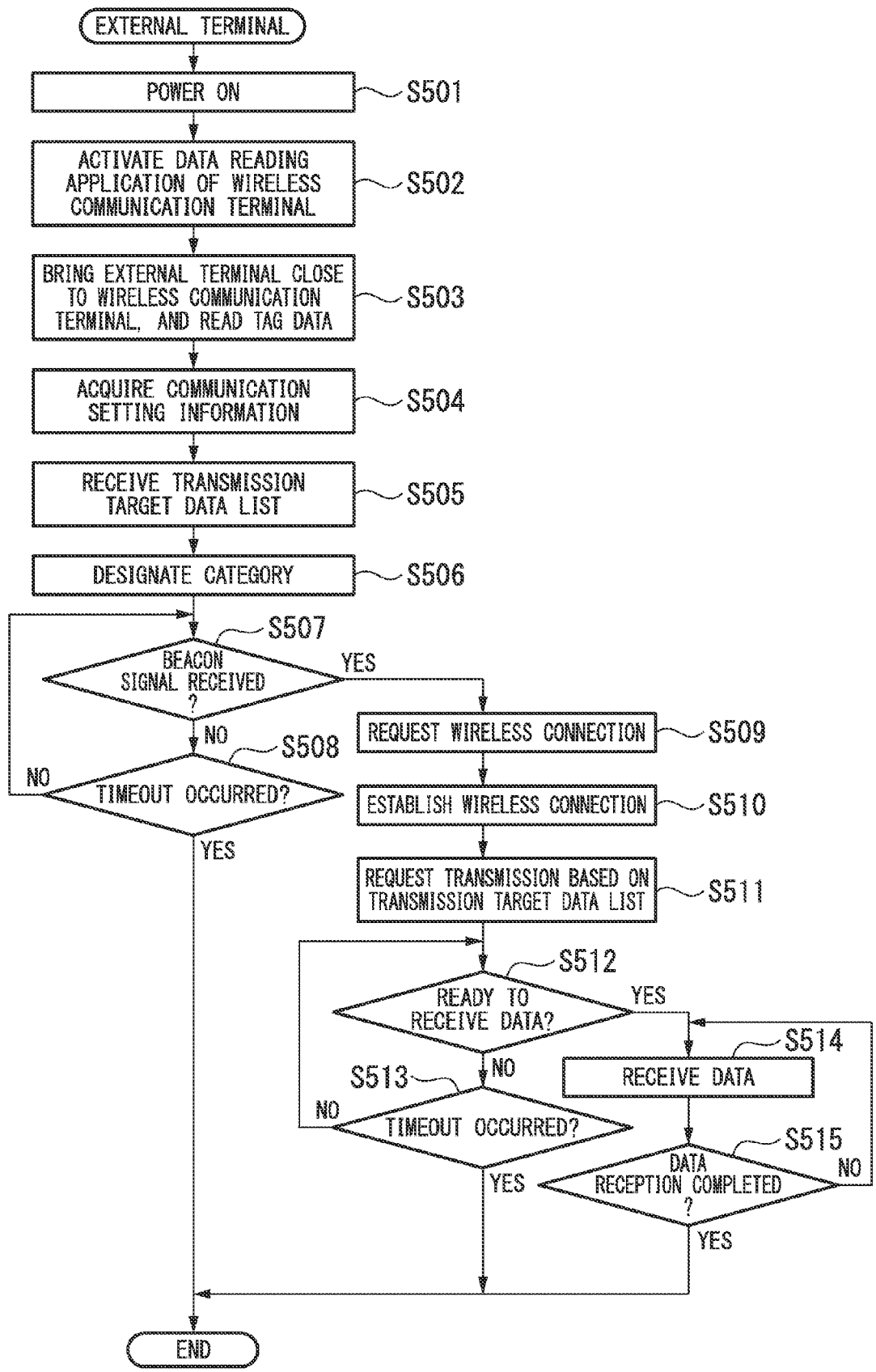
FIG. 13 is a flowchart showing an operation process of the external terminal when transmission and reception of data are performed between the wireless communication terminal and the external terminal according to the third embodiment of the present invention.

Next, an operation process when transmission and reception of data are performed between the wireless communication terminal 10 and the external terminal 20 will be described. FIG. 13 is a flowchart showing an operation process of the external terminal 20 when transmission and reception of data are performed between the wireless communication terminal 10 and the external terminal 20 according to the present embodiment.

The process of steps S501 to S505 is the same as the process of steps S301 to S305 in the second embodiment.

(Step S506) The terminal control unit 23 designates a category (condition) of transmission target data which is desired to be received in response to the user's input. Examples of the category include a MAC address of the external terminal 20, a shooting date and time of transmission target data, and a shooting place of transmission target data. Then, the tag reading unit 22 transmits information indicating the category designated by the terminal control unit 23 to the RFID module 12 of the wireless communication module 11. Thereafter, the process proceeds to step S507.

The process of steps S507 to S515 is the same as the process of steps S306 to S314 in the second embodiment.

Figure 14:
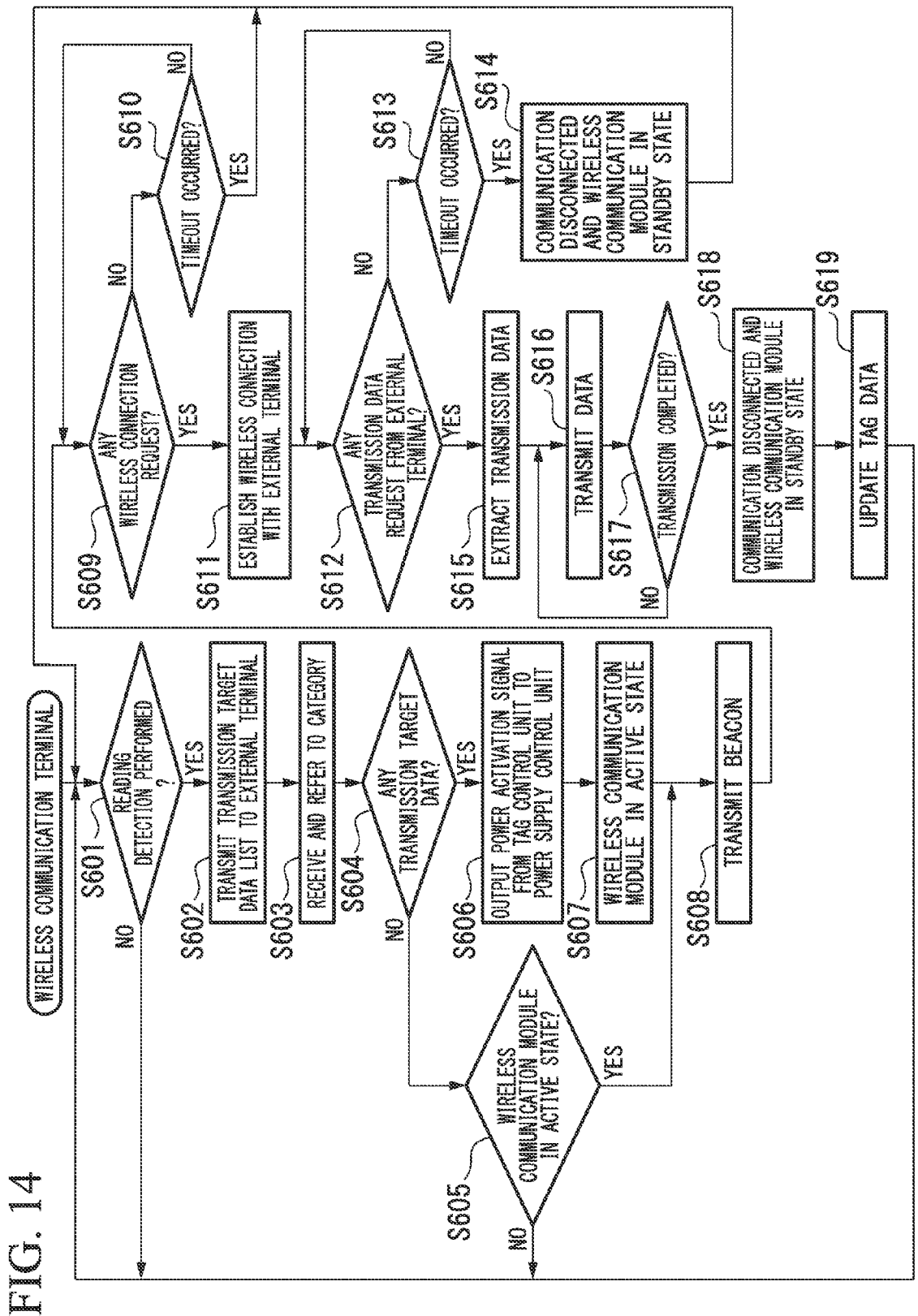
FIG. 14 is a flowchart showing an operation process of the wireless communication terminal when transmission and reception of data are performed between the wireless communication terminal and the external terminal according to the third embodiment of the present invention.

FIG. 14 is a flowchart showing an operation process of the wireless communication terminal 10 when transmission and reception of data are performed between the wireless communication terminal 10 and the external terminal 20 according to the present embodiment.

The process of step S601 is the same as the process of step S401 in the second embodiment.

(Step S602) The RFID module 12 transmits data including the communication setting information and the transmission target data list stored in the tag storage unit 122 to the tag reading unit 22 of the external terminal 20. Thereafter, the process proceeds to step S603.

(Step S603) The tag reading unit 22 of the external terminal 20 transmits the information indicating the category to the RFID module 12. The RFID module 12 receives the information indicating the category transmitted from the external terminal 20. Thereafter, the process proceeds to step S604.

(Step S604) The tag control unit 121 reads the transmission target data list stored in the tag storage unit 122, and determines whether or not there is transmission target data matching the category indicated by the information received in the process of step S603. When the tag control unit 121 determines that there is transmission target data matching the category, the process proceeds to step S606. In any other case, the process proceeds to step S605.

(Step S605) The control unit 13 determines whether or not the wireless communication module 11 is in the active state (the first state). When the control unit 13 determines that the wireless communication module 11 is in the active state, the process proceeds to step S608. In any other case, the process returns to step S601.

The process of steps S606 to S619 is the same as the process of steps S405 to S418 in the second embodiment.

Through the above-described process, according to the present embodiment, as the tag reading unit 22 of the external terminal 20 simply reads information from the RFID module 12 of the wireless communication terminal 10, it is possible to cause the wireless communication module 11 to automatically enter the active state only when necessary, and it is possible to automatically transmit necessary data. Further, since the wireless communication module 11 automatically returns to the standby state after data transmission, the user operating the external terminal 20 can acquire desired data without operating the wireless communication terminal 10.

Through the above-described process, according to the present embodiment, even in the case in which the tag reading unit 22 of the external terminal 20 has read information from the RFID module 12 of the wireless communication terminal 10, when there is no transmission target data, the wireless communication module 11 is not activated, and thus unnecessary power consumption can be prevented.

Through the above-described process, the tag reading unit 22 and the RFID module 12 exchange the transmission target data list before a wireless communication connection is established between the wireless communication module 11 and the terminal wireless communication module 21, and thus it is possible to select the transmission target data list which is desired to be received among transmission target data stored in the storage unit 17. Thus, since transmission and reception of unnecessary transmission target data is not performed, unnecessary power consumption can be prevented. In addition, since transmission and reception of the transmission target data list is performed between the tag reading unit 22 and the RFID module 12 instead of between the wireless communication module 11 and the terminal wireless communication module 21 which are high in power consumption, it can contribute to power consumption reduction.

Through the above-described process, the RFID module 12 of the wireless communication terminal 10 receives the information indicating the category transmitted from the external terminal 20. Then, when there is transmission target data corresponding to the category, the tag control unit 121 causes the wireless communication module 11 to enter the active state. When there is no transmission target data corresponding to the category, the tag control unit 121 does not cause the wireless communication module 11 to enter the active state. Thus, it is possible to set the state of the wireless communication module 11 for a plurality of external terminals 20 in detail.

After all transmission target data is transmitted to the external terminal 20 recognized as an unknown device, the data update unit 14 newly creates the "target device" of the external terminal 20 in the transmission target data list stored in the tag storage unit 122 (the process of step S619 in the flowchart illustrated in FIG. 14). As content of the newly created "target device," a MAC address of the external terminal 20 is stored in the data item "MAC address." Since all transmission target data is transmitted, "0" is stored in the data item "data."

The data update unit 14 may update the value of the data item "data" of the transmission target data list from "1" to "0" and delete the value of the data item "access path," for example, directly after transmission of transmission target data, after communication is disconnected, after electric power supply to a wireless module is interrupted, after a standby instruction is given, or after a power OFF instruction to turn off the wireless communication terminal 10 is given.

The data update unit 14 may update the value of the data item "data" of the transmission target data list from "0" to "1" and add the value of the data item "access path" directly after new image data is stored in the storage unit 17 of the wireless communication terminal 10 or when a certain period of time elapses after storage. For example, when the wireless communication terminal 10 is a digital camera, the data update unit 14 updates the value of the data item "data" of the transmission target data list from "0" to "1" and adds the value of the data item "access path" when there is no shooting instruction during a certain period of time, when an image reproduction instruction is given, or when a power OFF instruction is given.

In the above-described example, a MAC address is used as information specifying the external terminal 20, but information specifying the external terminal 20 is not limited to this example, and the external terminal 20 may be specified by an arbitrary name such as a user unique ID (UUID) or a nick name.

There are many cases in which, for the item "access path" of the target device whose MAC address is "Unknown" in the transmission target data list, all data stored in the storage unit 17 is transmission target data. In this case, since the data amount of the transmission target data list is large, data may be managed using metadata instead of storing all data using a file path or a file name. In this case, the tag reading unit 22 of the external terminal 20 may read metadata from the RFID module 12 of the wireless communication terminal 10. The metadata may be managed for each external terminal 20.

The metadata may be written, for example, in a text format, and a file path may be stored in the tag storage unit 122 using text data. A configuration of metadata may be a known xml or HTML format and thus is not illustrated separately.

The wireless communication terminal 10 transmits text data which is metadata to the external terminal 20. The external terminal 20 may extract a file path of transmission target data from text data, and makes a data transmission request based on file path information. The metadata may be generated by a data presence/absence information generating unit 131 equipped in the control unit 13 of the wireless communication terminal 10.

Figure 15:
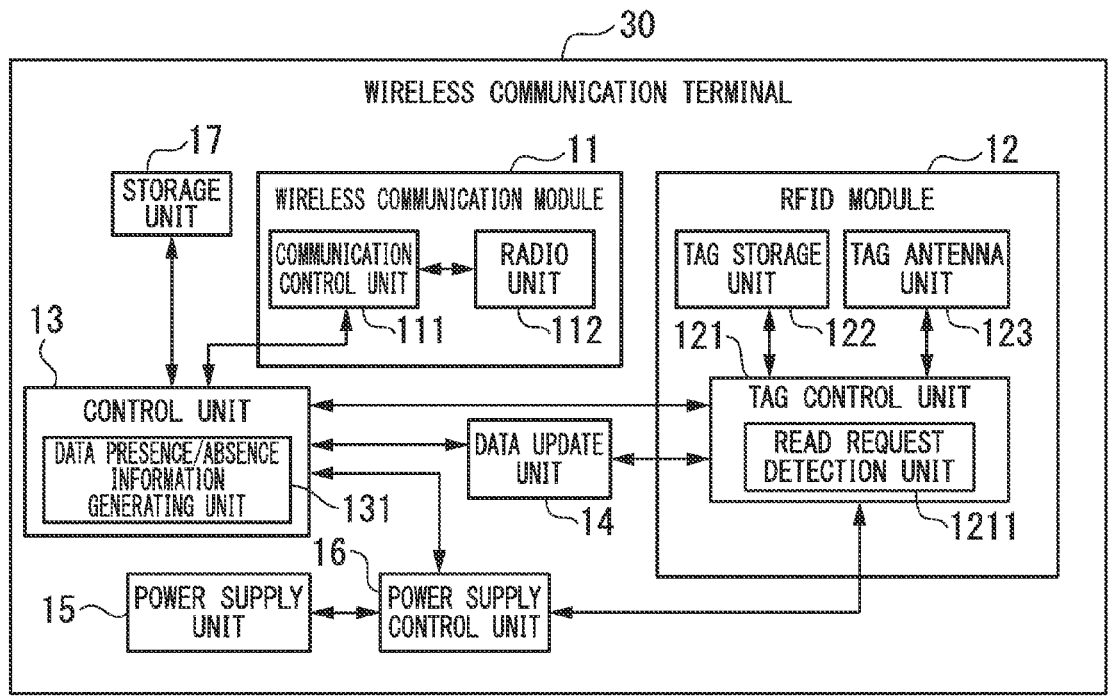
FIG. 15 is a block diagram showing the configuration of a wireless communication terminal in which a control unit includes a data presence/absence information generating unit according to the third embodiment of the present invention.

FIG. 15 is a block diagram showing a configuration of a wireless communication terminal 30 in which the control unit 13 includes the data presence/absence information generating unit 131 according to the present embodiment. In the example illustrated in FIG. 16, the wireless communication terminal 30 includes a wireless communication module 11, an RFID module 12, a control unit 13, a data update unit 14, a power supply unit 15, a power supply control unit 16, and a storage unit 17. In the present embodiment, the wireless communication module 11, the RFID module 12, the data update unit 14, the power supply unit 15, and the power supply control unit 16 are the same as the respective components illustrated in FIG. 3. The control unit 13 includes the data presence/absence information generating unit 131. The data presence/absence information generating unit 131 generates metadata.

The RFID module 12 operates based on electromotive force by a high-frequency magnetic field generated by the external terminal 20, but a power supply dedicated to the RFID module 12 may be provided under the assumption that the tag storage unit 122 stores a large amount of data.

Figure 16:
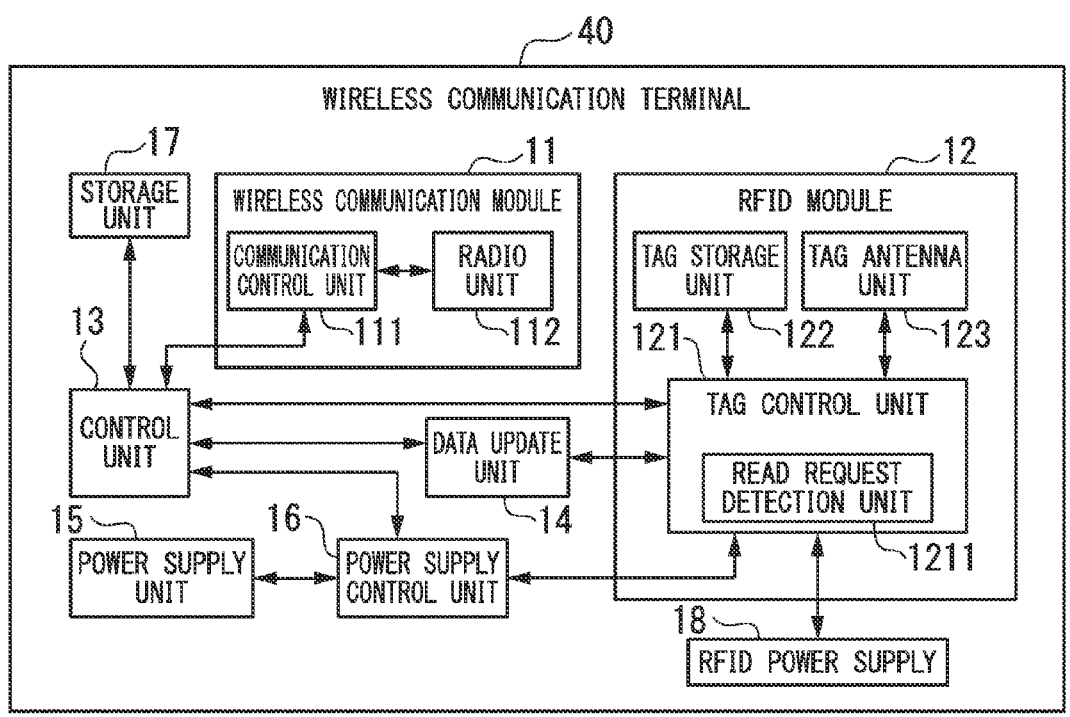
FIG. 16 is a block diagram showing a configuration of a wireless communication terminal including an RFID power supply according to the third embodiment of the present invention.

FIG. 16 is a block diagram showing a configuration of a wireless communication terminal 40 including an RFID power supply according to the present embodiment. In the example illustrated in FIG. 16, the wireless communication terminal 40 includes a wireless communication module 11, an RFID module 12, a control unit 13, a data update unit 14, a power supply unit 15, a power supply control unit 16, a storage unit 17, and an RFID power supply 18. In the present embodiment, the wireless communication module 11, the RFID module 12, the control unit 13, the data update unit 14, the power supply unit 15, and the power supply control unit 16 are the same as the respective components illustrated in FIG. 3. The RFID power supply 18 supplies electric power supply to the RFID module 12. In the case of this configuration, when communication using the RFID module 12, input/output of data to/from the control unit 13 or the like, an update of the tag storage unit 122, or the like is completed, the RFID power supply 18 operates to interrupt supply of electric power supply to the RFID module 12.

In this example, the example in which transmission target data is transmitted from the wireless communication terminal 10 to the external terminal 20 has been described, but the present invention is not limited to this example. For example, in order to establish a communication connection between the wireless communication module 11 of the wireless communication terminal 10 and the terminal wireless communication module 21 of the external terminal 20, data may be transmitted from the external terminal 20 to the wireless communication terminal 10.

Fourth Embodiment

Next, a fourth embodiment of the present invention will be described. A difference between the present embodiment and the first embodiment lies in that the wireless communication terminal 10 of the present embodiment includes a display unit, and performs a display indicating that transmission is being performed when transmission target data is being transmitted. In the present embodiment, the external terminal 20 has the same configuration as in the first embodiment.

Figure 17:
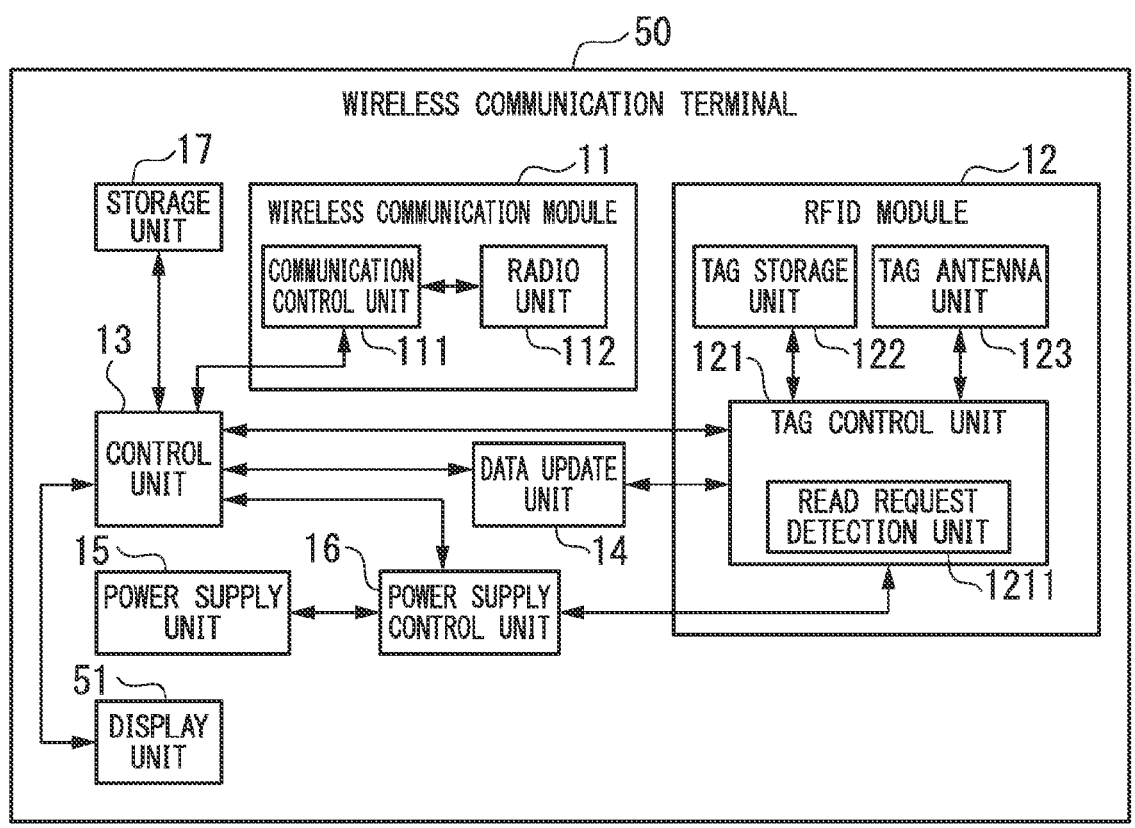
FIG. 17 is a block diagram showing a configuration of a wireless communication terminal according to a fourth embodiment of the present invention.

FIG. 17 is a block diagram showing a configuration of a wireless communication terminal 50 according to the present embodiment. In the example illustrated in FIG. 17, the wireless communication terminal 50 includes a wireless communication module 11, an RFID module 12, a control unit 13, a data update unit 14, a power supply unit 15, a power supply control unit 16, a storage unit 17, and a display unit 51. In the present embodiment, the wireless communication module 11, the RFID module 12, the control unit 13, the data update unit 14, the power supply unit 15, and the power supply control unit 16 are the same as the respective components illustrated in FIG. 3. The display unit 51 includes a display that displays an image or a graphical user interface (GUI) and a light emitting diode (LED).

Next, an operation process when transmission and reception of data are performed between the wireless communication terminal 50 and the external terminal 20 will be described. The operation process of the external terminal 20 when transmission and reception of data are performed between the wireless communication terminal 50 and the external terminal 20 is the same as the operation process of the external terminal 20 according to the first embodiment.

Figure 18:
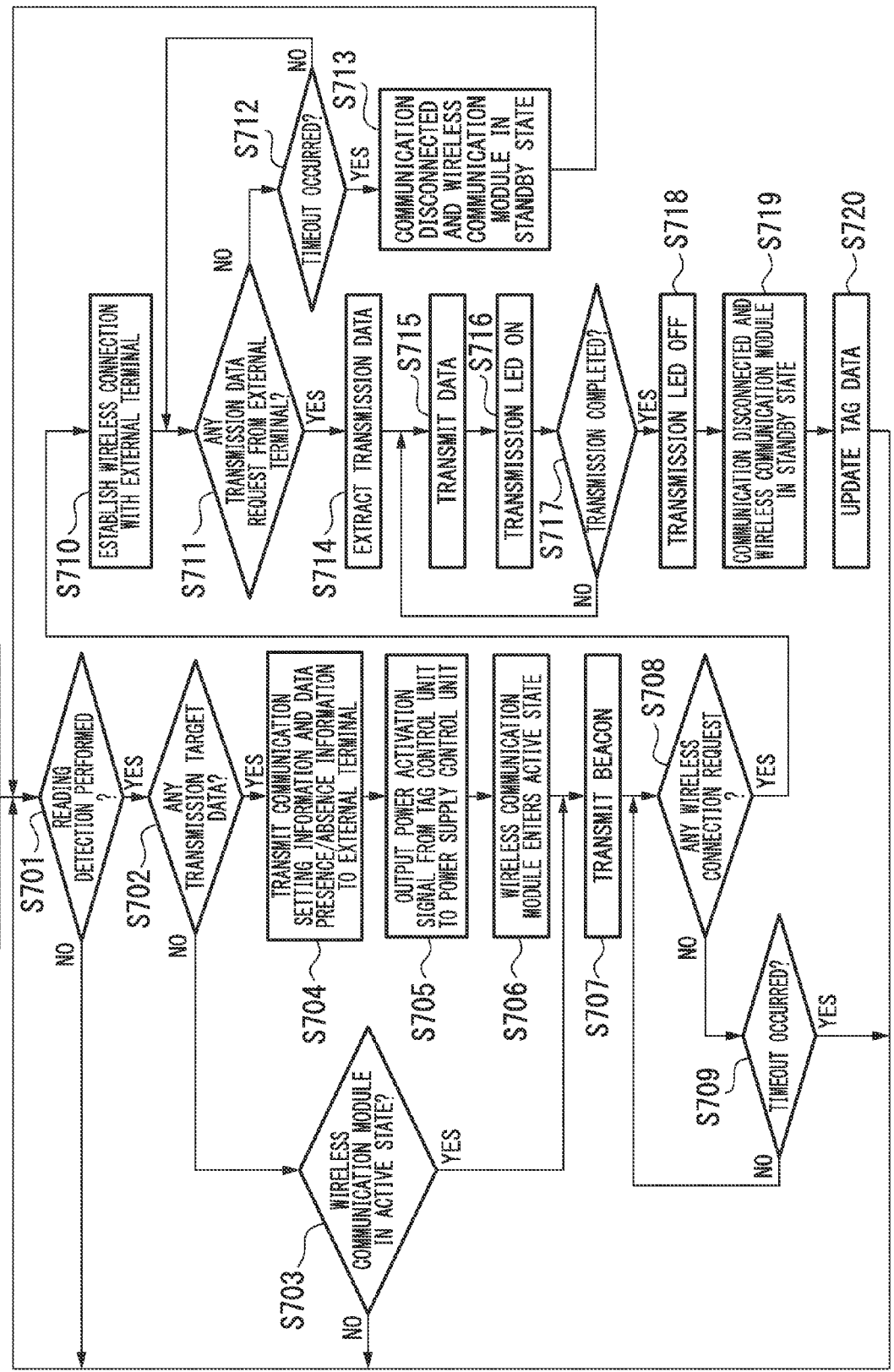
FIG. 18 is a flowchart showing an operation process of the wireless communication terminal when transmission and reception of data are performed between the wireless communication terminal and the external terminal according to the fourth embodiment of the present invention.

FIG. 18 is a flowchart showing an operation process of the wireless communication terminal 50 when transmission and reception of data are performed between the wireless communication terminal 50 and the external terminal 20 according to the present embodiment.

The process of steps S701 to S715 is the same as the process of steps S201 to S215 in the first embodiment.

(Step S716) The control unit 13 turns on the LED of the display unit 51. Thereafter, the wireless communication terminal 50 proceeds to the process of step S717.

The process of step S717 is the same as the process of step S216 in the first embodiment.

(Step S718) The control unit 13 turns off the LED of the display unit 51. Thereafter, the wireless communication terminal 50 proceeds to the process of step S719.

The process of steps S719 to S720 is the same as the process of steps S217 to S218 in the first embodiment.

Through the above-described process, according to the present embodiment, as the tag reading unit 22 of the external terminal 20 simply reads information from the RFID module 12 of the wireless communication terminal 50, it is possible to cause the wireless communication module 11 to automatically enter the active state only when necessary, and it is possible to automatically transmit necessary data. Further, since the wireless communication module 11 automatically returns to the standby state after data transmission, the user operating the external terminal 20 can acquire desired data without operating the wireless communication terminal 50.

Through the above-described process, according to the present embodiment, even in the case in which the tag reading unit 22 of the external terminal 20 has read information from the RFID module 12 of the wireless communication terminal 50, when there is no transmission target data, the wireless communication module 11 is not activated, and thus unnecessary power consumption can be prevented.

Through the above-described process, according to the present embodiment, since the LED of the display unit 51 is turned on during transmission of transmission target data, the user can be easily informed of whether or not data is being transmitted. Further, since minimum electric power supply necessary to turn on the LED is used as electric power supply performed to the display unit 51, it can contribute to power saving in the wireless communication terminal 50.

Fifth Embodiment

Next, a fifth embodiment of the present invention will be described. A difference between the present embodiment and the fourth embodiment lies in that a power supply control unit 16 of a wireless communication terminal 60 according to the present embodiment includes a determining unit, and changes an electric power supply destination according to residual electric power supply energy of the power supply unit 15. In the present embodiment, the external terminal 20 has the same configuration as in the fourth embodiment.

Figure 19:
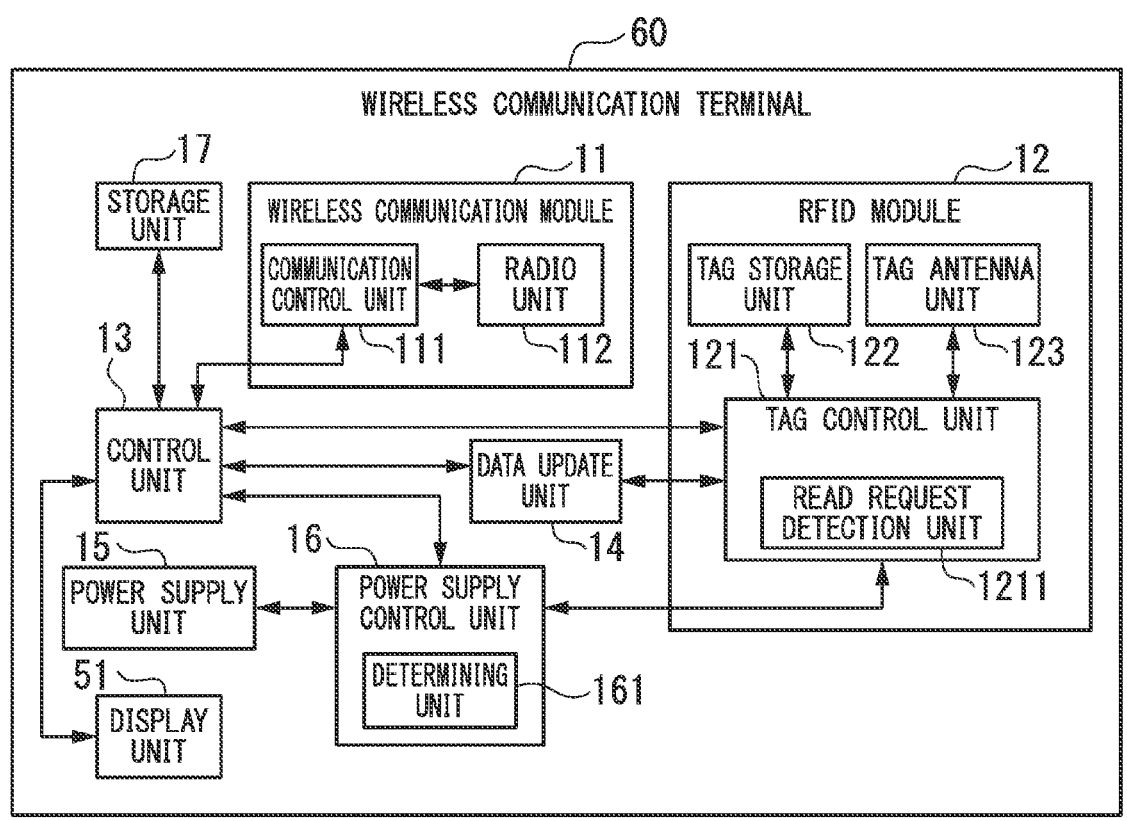
FIG. 19 is a block diagram showing the configuration of a wireless communication terminal according to a fifth embodiment of the present invention.

FIG. 19 is a block diagram showing a configuration of the wireless communication terminal 60 according to the present embodiment. In the example illustrated in FIG. 19, the wireless communication terminal 50 includes a wireless communication module 11, an RFID module 12, a control unit 13, a data update unit 14, a power supply unit 15, a power supply control unit 16, a storage unit 17, and a display unit 51. In the present embodiment, the wireless communication module 11, the RFID module 12, the control unit 13, the data update unit 14, the power supply unit 15, and the display unit 51 are the same as the respective components illustrated in FIG. 17. The power supply control unit 16 includes a determining unit 161. The determining unit 161 determines the residual electric power supply energy of the power supply unit 15.

Next, an operation process when transmission and reception of data are performed between the wireless communication terminal 60 and the external terminal 20 will be described. The operation process of the external terminal 20 when transmission and reception of data are performed between the wireless communication terminal 60 and the external terminal 20 is the same as that of the external terminal 20 in the fourth embodiment.

Figure 20:
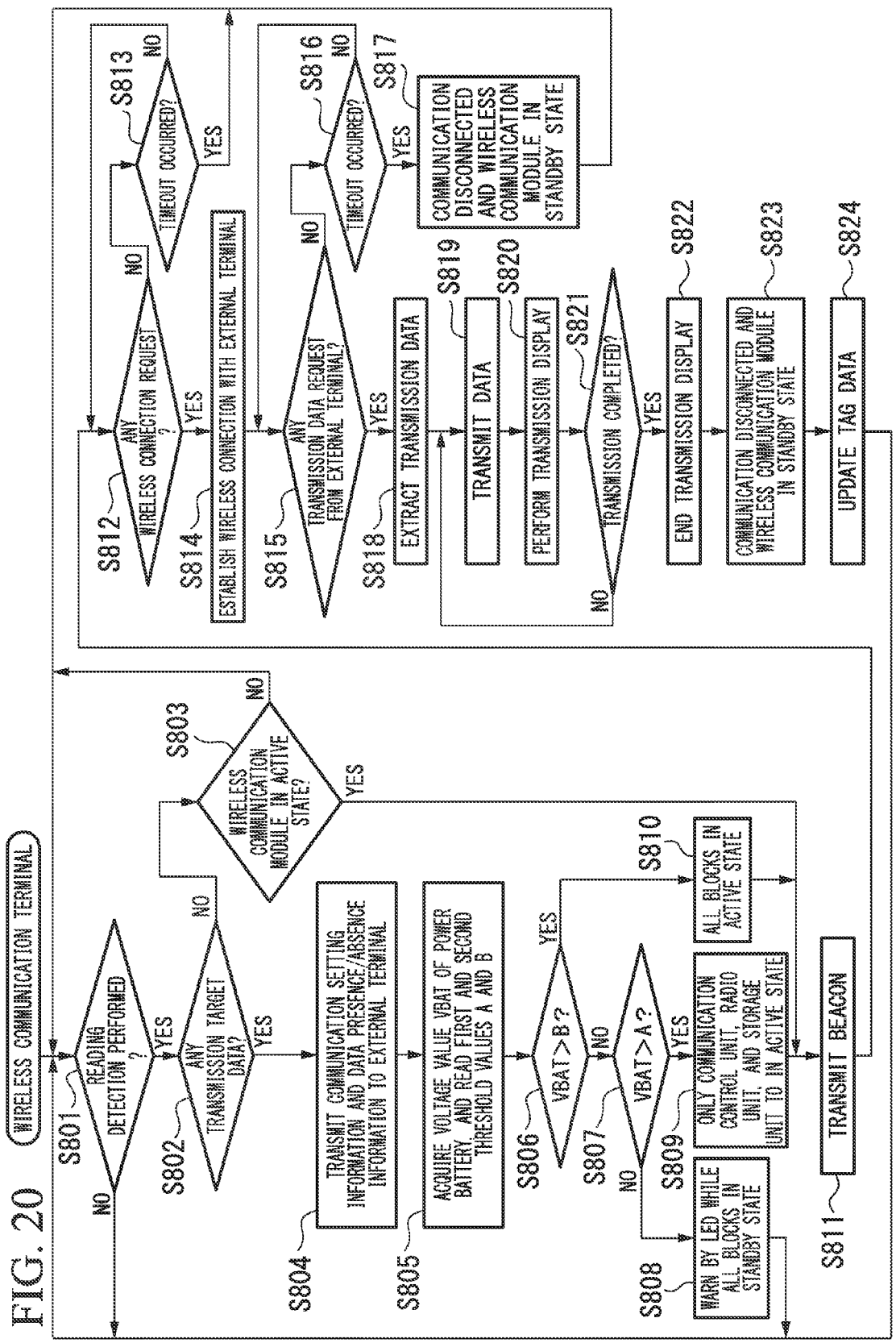
FIG. 20 is a flowchart showing an operation process of the wireless communication terminal when transmission and reception of data are performed between the wireless communication terminal and the external terminal according to the fifth embodiment of the present invention.

FIG. 20 is a flowchart showing an operation process of the wireless communication terminal 60 when transmission and reception of data are performed between the wireless communication terminal 60 and the external terminal 20 according to the present embodiment.

The process of steps S801 to S804 is the same as the process of steps S701 to S704 in the third embodiment.

(Step S805) The determining unit 161 acquires a voltage value VBAT of the power supply unit 15. The determining unit 161 reads a first threshold value A and a second threshold value B from the storage unit 17. Thereafter, the process proceeds to step S806. The first threshold value A and the second threshold value B may be decided in advance and may be set arbitrarily.

(Step S806) The determining unit 161 determines whether or not the voltage value VBAT of the power supply unit 15 acquired in step S805 is larger than the second threshold value B. When the voltage value VBAT of the power supply unit 15 is determined to be larger than the second threshold value B, the process proceeds to step S810. In any other case, the process proceeds to step S807.

(Step S807) The determining unit 161 determines whether or not the voltage value VBAT of the power supply unit 15 acquired in step S805 is larger than the first threshold value A. When the voltage value VBAT of the power supply unit 15 is determined to be larger than the first threshold value A, the process proceeds to step S809. In any other case, the process proceeds to step S808.

(Step S808) The power supply control unit 16 causes all blocks to enter the standby state. Further, the control unit 13 turns on the LED of the display unit 51 to perform a warning display. Thereafter, the process returns to step S801.

(Step S809) The power supply control unit 16 causes only the wireless communication module 11 and the storage unit 17 to enter the active state. Thereafter, the process proceeds to step S811.

(Step S810) The power supply control unit 16 causes all blocks to enter the active state. Thereafter, the process proceeds to step SS 11.

The process of steps S811 to S819 is the same as the process of steps S707 to S715 in the third embodiment.

(Step S820) The control unit 13 causes information indicating that transmission data is being transmitted to be displayed on the display unit 51. Thereafter, the process proceeds to step S821. The display of the information indicating that transmission data is being transmitted is performed such that information indicating the details of a communication state is displayed on the display unit 51 using a GUI or the like when all blocks have entered the active state in the process of step S810. Further, when only the wireless communication module 11 and the storage unit 17 have entered the active state in the process of step S809, the LED of the display unit 51 is turned on.

The process of step S821 is the same as the process of step S717 in the third embodiment.

(Step S822) The control unit 13 ends the display of the information indicating that transmission data is being transmitted by the display unit 51 which has started in the process of step S820. Thereafter, the process proceeds to step S823.

The process of steps S823 and S824 is the same as the process of steps S719 and S720 in the third embodiment.

Through the above-described process, according to the present embodiment, as the tag reading unit 22 of the external terminal 20 simply reads information from the RFID module 12 of the wireless communication terminal 60, it is possible to cause the wireless communication module 11 to automatically enter the active state only when necessary, and it is possible to automatically transmit necessary data. Further, since the wireless communication module 11 automatically returns to the standby state after data transmission, the user operating the external terminal 20 can acquire desired data without operating the wireless communication terminal 60.

Through the above-described process, according to the present embodiment, even in the case in which the tag reading unit 22 of the external terminal 20 has read information from the RFID module 12 of the wireless communication terminal 60, when there is no transmission target data, the wireless communication module 11 is not activated, and thus unnecessary power consumption can be prevented.

Through the above-described process, according to the present embodiment, when the residual electric power supply energy of the power supply unit 15 is large, a transmission state is displayed on the display unit 51 using a GUI or the like. As a result, when there is enough residual electric power supply energy of the power supply unit 15, it is possible to inform the user of a more detailed transmission state.

All or some functions of the respective components of the wireless communication terminals 10, 30, 40, 50, and 60 and the external terminal 20 in the above embodiments may be implemented such that a program for implementing the functions is recorded in a computer readable recording medium, and a computer system reads and executes the program recorded in the recording medium. Here, the "computer system" includes an operating system (OS) and hardware such as peripheral devices and the like.

Further, the "computer readable recording medium" is a portable medium such as a flexible disk, a magneto optical disc, a ROM, or a CD-ROM or a storage unit such as a hard disk equipped in a computer system. Further, the 'computer readable recording medium" may also include a medium that actively holds a program during a short period of time such as a communication line when a program is transmitted via a network such as the Internet or a communication line such as a telephone line and a medium that holds a program during a certain period of time such as a volatile memory in a computer system serving as a server or a cloud in this case. Further, the program may implement some of the above-described functions, and may implement the functions in combination with a program already recorded in a computer.

The first to fourth embodiments of the invention have been described above with reference to the appended drawings, but a concrete configuration is not limited to the above embodiments, and a design in the scope not departing from the gist of the invention is also included. Addition, omission, replacement, or any other change of a configuration can be made within the scope not departing from the gist of the invention. The present invention is not limited by the above description, and is only limited by the appended claims.

What is claimed is:

1. A wireless communication terminal with an RFID module, comprising:
    a wireless communication module configured to operate in one of a first state in which wireless communication with an external terminal is performed through a layer higher than a data link layer and a second state in which the wireless communication with the external terminal is not performed through the layer higher than the data link layer or electric power supply used to perform wireless communication with the external terminal through the data link layer is not performed, the wireless communication module wirelessly transmitting transmission target data when operating in the first state;

a power supply unit configured to perform the electric power supply to the wireless communication module;

a power supply control unit configured to perform power supply control of the power supply unit;

a control unit configured to set parameters of the layer higher than the data link layer to parameters of the wireless communication module;

an RFID module configured to store wireless communication setting information which is used for the external terminal to perform wireless communication with the wireless communication module and data presence/absence information indicating presence/absence of the transmission target data, the RFID module detecting a read request to read the wireless communication setting information transmitted from the external terminal, the RFID module wirelessly transmitting the wireless communication setting information to the external terminal that has transmitted the read request in response to the read request when the read request is detected; and a data update unit configured to update the data presence/absence information stored in the RFID module, wherein the RFID module outputs a signal to one of the control unit and the power supply control unit when the read request is detected and the data presence/absence information indicating the presence of the transmission target data is stored while the wireless communication module is operating in the second state, the signal causing a state of the wireless communication module to transition from the second state to the first state.

2. The wireless communication terminal with the RFID module according to claim 1, wherein
the first state is a state in which the electric power supply is performed from the power supply unit to the wireless communication module,
the second state is a state in which the electric power supply is not performed from the power supply unit to the wireless communication module,
the power supply control unit controls the electric power supply to the wireless communication module, and
the RFID module outputs a signal to instruct the electric power supply to the wireless communication module to the power supply control unit as the signal causing transition from the second state to the first state.

3. The wireless communication terminal with the RFID module according to claim 2, further comprising:
a display unit configured to display data,
wherein the power supply unit performs the electric power supply to the wireless communication module, and
the power supply control unit controls the electric power supply to the display unit.

4. The wireless communication terminal with the RFID module according to claim 3,
wherein the power supply control unit detects residual electric power supply of the power supply unit when the signal to instruct the electric power supply to the wireless communication module is input from the RFID module,
the power supply control unit controls the power supply unit such that electric power supply is performed to the display unit and the wireless communication module when the residual electric power supply is equal to or larger than a first threshold value, and
the power supply control unit controls the power supply unit such that the electric power supply is performed to the wireless communication module without performing electric power supply to the display unit when the residual electric power supply of the power supply unit is less than the first threshold value.

5. The wireless communication terminal with the RFID module according to claim 4,
wherein the power supply control unit detects the residual electric power supply of the power supply unit when the signal to instruct t the electric power supply to the wireless communication module is input from the RFID module, controls the power supply unit such that the electric power supply is not performed to the display unit but performed to the wireless communication module when the residual electric power supply is equal to or larger than a second threshold value which is lower than the first threshold value, and controls the power supply unit such that the electric power supply is not performed to the wireless communication module and the display unit when the residual electric power supply is equal to or less than the second threshold value.

6. The wireless communication terminal with the RFID module according to claim 1,
wherein the RFID module outputs a signal, which causes transition from a standby state as the second state to an active state as the first state, to the control unit as the signal causing transition from the second state to the first state.

7. The wireless communication terminal with the RFID module according to claim 1,
wherein the RFID module stores a list of the transmission target data as the data presence/absence information, and transmits the list to the external terminal.

8. The wireless communication terminal with the RFID module according to claim 1,
wherein the data update unit updates the data presence/absence information stored in the RFID module after the wireless communication module transmits the transmission target data to the external terminal.

9. The wireless communication terminal with the RFID module according to claim 1,
wherein the RFID module stores the data presence/absence information for each external terminal, and
the data update unit updates the data presence/absence information for each external terminal.

10. The wireless communication terminal with the RFID module according to claim 1, further comprising:
a storage unit configured to store metadata of the transmission target data; and
a generating unit configured to generate the data presence/absence information based on the metadata.

11. The wireless communication terminal with the RFID module according to claim 1,
wherein, when information designating a condition of the transmission target data is acquired from the external terminal, the RFID module determines whether or not there is transmission target data satisfying the condition, and wirelessly transmits the wireless communication setting information when it is determined that there is transmission target data satisfying the condition.

12. The wireless communication terminal with the RFID module according to claim 1,
wherein the power supply unit does not perform the electric power supply to the RFID module.

13. A wireless communication system, comprising:
a wireless communication terminal with an RFID module; and
an external terminal,
wherein the wireless communication terminal with the RFID module comprises:
a wireless communication module configured to operate in one of a first state in which wireless communication with the external terminal is performed through a layer higher than a data link layer and a second state in which the wireless communication with the external terminal is not performed through the layer higher than the data link layer or electric power supply used to perform wireless communication with the external terminal through the data link layer is not performed, the wireless communication module wirelessly transmitting transmission target data when operating in the first state;
a power supply unit configured to perform the electric power supply to the wireless communication module;
a power supply control unit configured to perform power supply control of the power supply unit;
a control unit configured to perform control such that parameters of the layer higher than the data link layer is set to parameters of the wireless communication module;
an RFID module configured to store wireless communication setting information which is used for the external terminal to perform wireless communication with the wireless communication module and data presence/absence information indicating presence/absence of the transmission target data, the RFID module detecting a read request to read the wireless communication setting information transmitted from the external terminal, the RFID module wirelessly transmitting the wireless communication setting information to the external terminal that has transmitted the read request in response to the read request when the read request is detected; and
a data update unit configured to update the data presence/absence information stored in the RFID module,
wherein when the read request is detected and the data presence/absence information indicating the presence of the transmission target data is stored while the wireless communication module is operating in the second state, the RFID module outputs a signal to one of the control unit and the power supply control unit which causes a state of the wireless communication module to transition from the second state to the first state, and
the external terminal comprises:
a tag reading unit configured to transmit the read request to the RFID module, and receives the wireless communication setting information transmitted in response to the read request, and
a terminal wireless communication module configured to perform wireless communication with the wireless communication module using the wireless communication setting information received by the tag reading unit.

14. A wireless communication method, comprising:
a wireless communication step of wirelessly transmitting transmission target data when a wireless communication module operates in a first state, the wireless communication module being configured to operate in one of a first state in which wireless communication with an external terminal is performed through a layer higher than a data link layer and a second state in which the wireless communication with the external terminal is not performed through the layer higher than the data link layer or electric power supply used to perform wireless communication with the external terminal through the data link layer is not performed;
a power supply control step in which a power supply control unit controls power supply of a power supply unit configured to perform the electric power supply to the wireless communication module;
a control step in which a control unit sets parameters of the layer higher than the data link layer to parameters of the wireless communication module;
a step of wirelessly transmitting the wireless communication setting information to the external terminal that has transmitted a read request in response to the read request when the read request to read the wireless communication setting information transmitted from the external terminal is detected by an RFID module that is configured to store wireless communication setting information which is used for the external terminal to perform wireless communication with the wireless communication module and data presence/absence information indicating presence/absence of the transmission target data; and
a step of outputting a signal by the RFID module to one of the control unit and the power supply control unit when the read request is detected and the data presence/absence information indicating the presence of the transmission target data is stored while the wireless communication module is operating in the second state, the signal causing a state of the wireless communication module to transition from the second state to the first state.

15. A non-transitory medium storing a program to execute:
a wireless communication step of wirelessly transmitting transmission target data when a wireless communication module operates in a first state, the wireless communication module being configured to operate in one of a first state in which wireless communication with an external terminal is performed through a layer higher than a data link layer and a second state in which the wireless communication with the external terminal is not performed through the layer higher than the data link layer or electric power supply used to perform wireless communication with the external terminal through the data link layer is not performed;
a power supply control step in which a power supply control unit controls power supply of power supply unit configured to perform the electric power supply to the wireless communication module;
a control step in which a control unit sets parameters of the layer higher than the data link layer to parameters of the wireless communication module;
a step of wirelessly transmitting the wireless communication setting information to the external terminal that has transmitted a read request in response to the read request when the read request to read the wireless communication setting information transmitted from the external terminal is detected by an RFID module that is configured to store wireless communication setting information which is used for the external terminal to perform wireless communication with the wireless communication module and data presence/absence information indicating presence/absence of the transmission target data; and
a step of outputting a signal by the RFID module to one of the control unit and the power supply control unit when the read request is detected and the data presence/absence information indicating the presence of the transmission target data is stored while the wireless communication module is operating in the second state, the signal causing a state of the wireless communication module to transition from the second state to the first state.

* * * * *